United States Patent
Colonna et al.

(10) Patent No.: US 10,395,519 B2
(45) Date of Patent: Aug. 27, 2019

(54) METHOD AND SYSTEM FOR COMPUTING AN O-D MATRIX OBTAINED THROUGH RADIO MOBILE NETWORK DATA

(71) Applicant: TELECOM ITALIA S.p.A., Milan (IT)

(72) Inventors: Massimo Colonna, Turin (IT); Marco Galassi, Reggio Emilia (IT); Marco Mamei, Reggio Emilia (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

(21) Appl. No.: 15/751,536

(22) PCT Filed: Aug. 11, 2015

(86) PCT No.: PCT/EP2015/068456
§ 371 (c)(1),
(2) Date: Feb. 9, 2018

(87) PCT Pub. No.: WO2017/025134
PCT Pub. Date: Feb. 16, 2017

(65) Prior Publication Data
US 2018/0233032 A1  Aug. 16, 2018

(51) Int. Cl.
*G08G 1/01* (2006.01)
*G06Q 10/04* (2012.01)
*H04W 84/04* (2009.01)

(52) U.S. Cl.
CPC .......... *G08G 1/012* (2013.01); *G06Q 10/047* (2013.01); *G08G 1/0129* (2013.01); *H04W 84/042* (2013.01)

(58) Field of Classification Search
CPC .... G08G 1/012; G08G 1/0129; G06Q 10/047; H04W 84/042
See application file for complete search history.

(56) References Cited

U.S. PATENT DOCUMENTS 6,975,873 B1 * 12/2005 Banks ............... H04W 64/00
455/456.1
7,479,901 B2 * 1/2009 Horstemeyer ........ B60R 25/102
340/994

(Continued)

FOREIGN PATENT DOCUMENTS

EP       2 819 383 A1   12/2014
WO    2015/018445 A1   2/2015

OTHER PUBLICATIONS

International Search Report and Written Opinion dated Apr. 14, 2016, in PCT/EP2015/068456 filed Aug. 11, 2015.

*Primary Examiner* — Quang Pham
(74) *Attorney, Agent, or Firm* — Oblon, McClelland, Maier & Neustadt, L.L.P.

(57) ABSTRACT

A method for managing data regarding one or more flows of physical entities in a geographic area during at least one predetermined time period is provided. The method includes: subdividing the geographic area into at least two zones; subdividing the at least one time period into one or more time slots; identifying a number of physical entities that flowed from a first zone of the at least two zones to a second zone of the at least two zones during each time slot, and computing an Origin-Destination matrix for each time slot of the one or more time slots based on such identifying.

15 Claims, 14 Drawing Sheets

(56) References Cited

U.S. PATENT DOCUMENTS

| | | | | |
|---|---|---|---|---|
| 8,532,648 B2* | 9/2013 | Moritz | G01S 5/0018 | 370/352 |
| 9,674,667 B2* | 6/2017 | Carlsson | H04W 64/003 | |
| 2006/0053110 A1* | 3/2006 | McDonald | G06Q 30/02 | |
| 2006/0105815 A1* | 5/2006 | Jendbro | H04W 64/00 | 455/566 |
| 2010/0273491 A1* | 10/2010 | Colonna | G08G 1/0104 | 455/440 |
| 2010/0273508 A1* | 10/2010 | Parata | G08G 1/0104 | 455/456.1 |
| 2010/0285772 A1* | 11/2010 | Colonna | G08G 1/0104 | 455/405 |
| 2011/0177832 A1* | 7/2011 | Huang | G01S 5/02 | 455/457 |
| 2012/0191505 A1* | 7/2012 | Shang | H04W 4/029 | 705/7.31 |
| 2013/0035089 A1* | 2/2013 | Moritz | H04W 64/00 | 455/422.1 |
| 2014/0031055 A1* | 1/2014 | Do | H04W 16/18 | 455/456.1 |
| 2015/0005030 A1 | 1/2015 | Pennanen et al. | | |
| 2015/0019294 A1* | 1/2015 | Milton | G06Q 30/0205 | 705/7.34 |
| 2015/0100643 A1 | 4/2015 | Pennanen et al. | | |
| 2015/0326709 A1 | 11/2015 | Pennanen et al. | | |
| 2016/0203713 A1* | 7/2016 | Colonna | G08G 1/0112 | 701/117 |
| 2017/0041762 A1* | 2/2017 | Colonna | H04L 67/16 | |
| 2017/0339521 A1* | 11/2017 | Colonna | H04W 4/029 | |
| 2017/0353830 A1* | 12/2017 | Colonna | H04W 4/029 | |
| 2017/0353831 A1* | 12/2017 | Colonna | H04W 4/029 | |
| 2017/0359686 A1* | 12/2017 | Colonna | H04W 4/029 | |
| 2018/0109918 A1* | 4/2018 | Colonna | H04W 4/022 | |
| 2018/0124566 A1* | 5/2018 | Colonna | H04W 4/029 | |
| 2018/0233032 A1* | 8/2018 | Colonna | G08G 1/012 | |

* cited by examiner

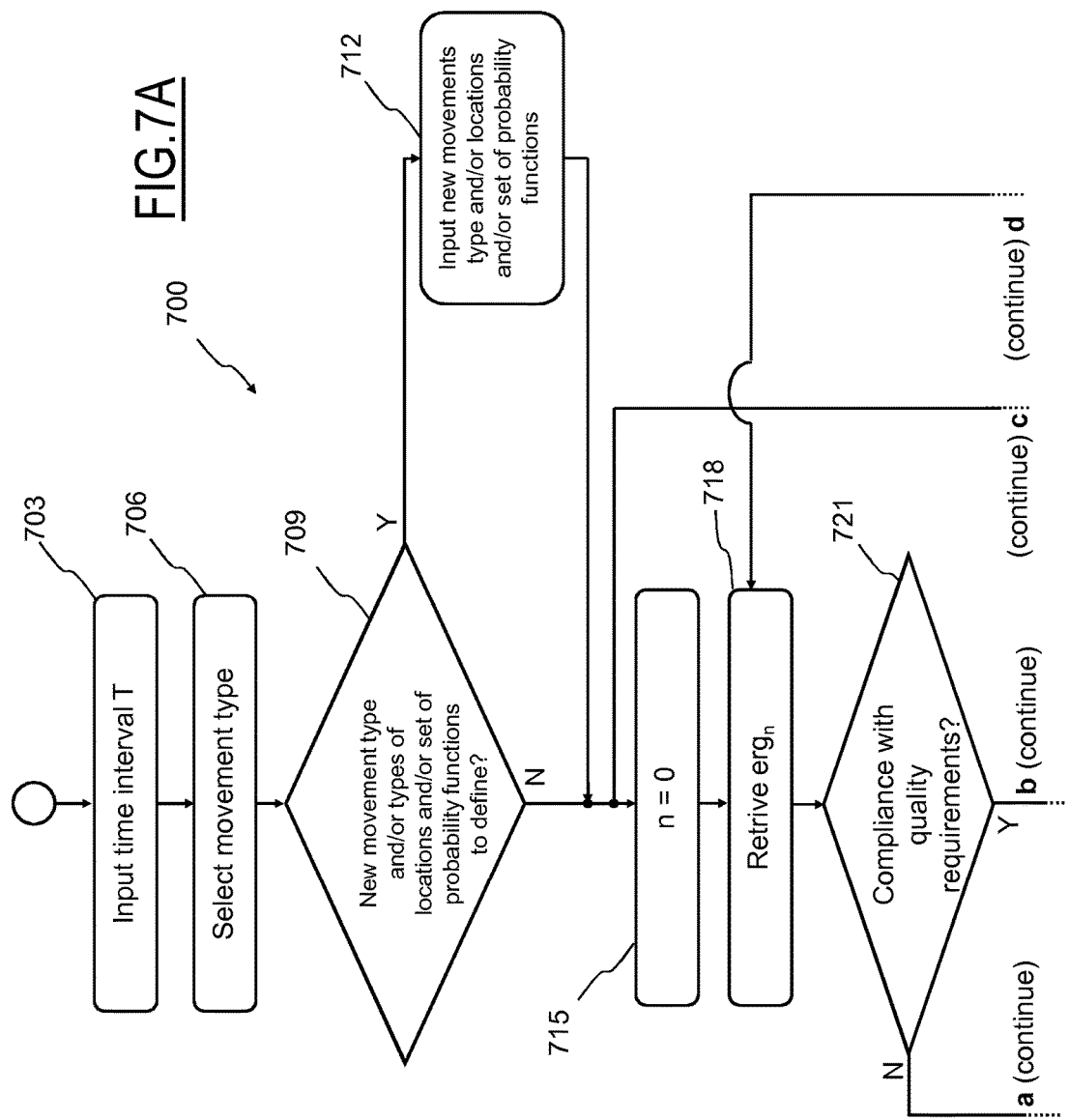

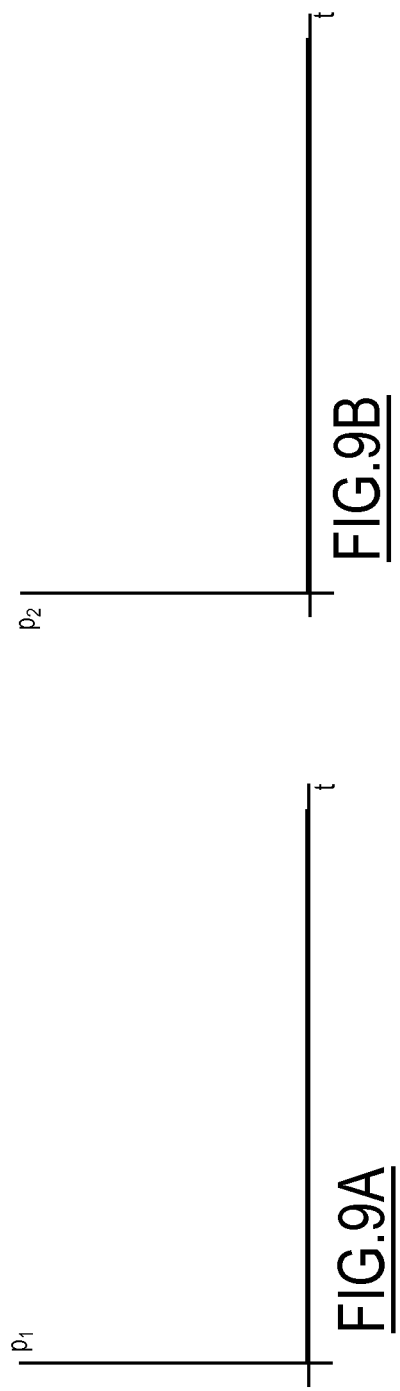
FIG.9A
FIG.9B
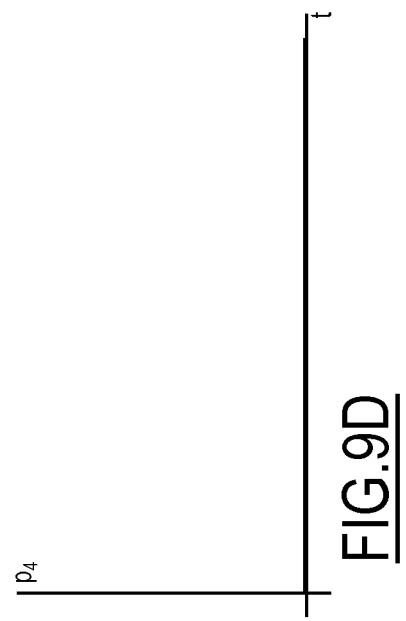
FIG.9C
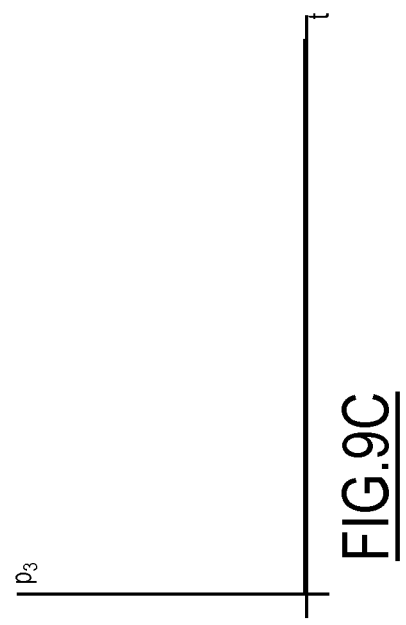
FIG.9D

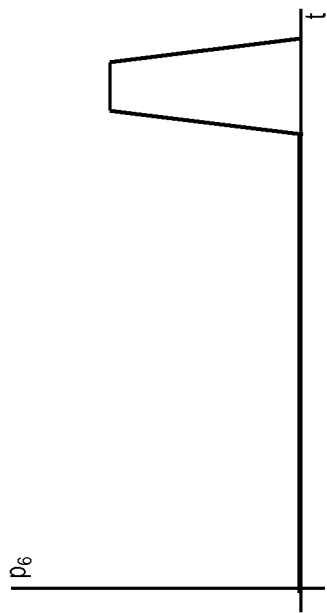
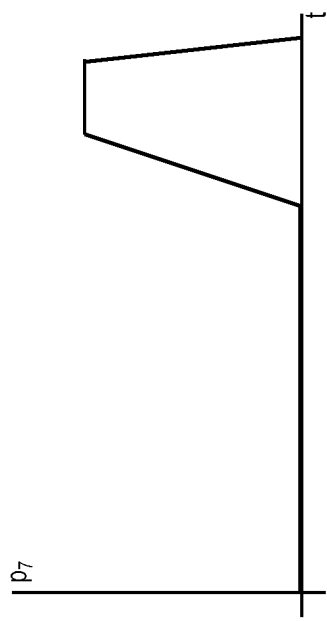
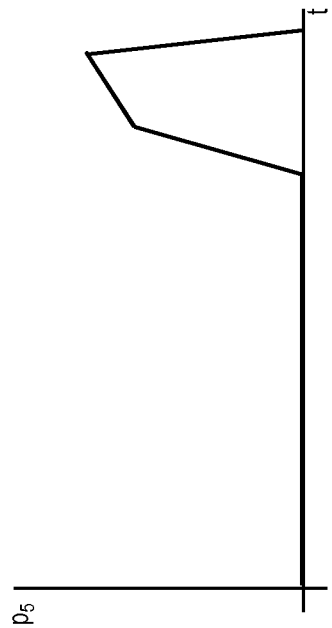

METHOD AND SYSTEM FOR COMPUTING AN O-D MATRIX OBTAINED THROUGH RADIO MOBILE NETWORK DATA

BACKGROUND OF THE INVENTION

Field of the Invention

The solution according to the present invention refers to analysis of traffic flows of moving physical entities. In detail, the solution according to the present invention relates to management of empirical data collected for performing traffic analysis. In more detail, the solution according to the present invention relates to a method and a system of O-D matrix computing obtained through radio mobile network data.

Overview of the Related Art

Traffic analysis is aimed at identifying and predicting variations in the flow (e.g., people flow, vehicular traffic flow) of physical entities (e.g., people, land vehicles) moving in a geographic region of interest (e.g., a urban area) and over a predetermined observation period (e.g., a 24 hours observation period).

A typical, but not limitative, example of traffic analysis is represented by the analysis of vehicular (cars, trucks, etc.) traffic flow over the routes of a geographic region of interest, or simply Region of Interest (RoI for short). Such analysis allows achieving a more efficient planning of the transportation infrastructure within the Region of Interest and also it allows predicting how changes in the transportation infrastructure, such as for example closure of roads, changes in a sequencing of traffic lights, construction of new roads and new buildings, can impact on the vehicular traffic.

In the following for traffic analysis it is intended the analysis of the movements of physical entities through a geographic area. Such physical entities can be vehicles (e.g., cars, trucks, motorcycles, public transportation buses) and/or individuals.

Since it is based on statistical calculations, traffic analysis needs a large amount of empirical data to be collected in respect of the Region of Interest and the selected observation period, in order to provide accurate results. In order to perform the analysis of traffic, the collected empirical data are then usually arranged in a plurality of matrices, known in the art as Origin-Destination (O-D) matrices. The O-D matrices are based upon a partitioning of both the Region of Interest and the observation period.

For partitioning the Region of Interest, the area is subdivided into a plurality of zones, each zone being defined according to several parameters such as for example, authorities in charge of the administration of the zones (e.g., a municipality), typology of land lots in the Region of Interest (such as open space, residential, agricultural, commercial or industrial lots) and physical barriers (e.g., rivers) that can hinder traffic (physical barriers can be used as zone boundaries). The size of the zones in which the Region of Interest can be subdivided, and consequently the number of zones, is proportional to the level of detail requested for the traffic analysis (i.e., city districts level, city level, regional level, state level, etc.).

Similarly, the observation period can be subdivided into one or more time slots, each time slot may be defined according to known traffic trends, such as for example peak traffic hours corresponding to when most commuters travel to their workplace and/or travel back to home. The length of the time slots (and thus their number) is proportional to the level of detail requested for the traffic analysis over the considered observation period.

Each entry of a generic O-D matrix comprises the number of physical entities moving from a first zone (origin) to a second zone (destination) of the area of interest. Each O-D matrix corresponds to one time slot out of the one or more time slots in which the considered observation period can be subdivided. In order to obtain a reliable traffic analysis, sets of O-D matrices should be computed over a plurality of analogous observation periods and should be combined so as to obtain O-D matrices with a higher statistical value. For example, empirical data regarding the movements of physical entities should be collected over a number of (consecutive or not) days (each corresponding to a different observation period), and for each day a corresponding set of O-D matrices should be computed.

A typical method for collecting empirical data used to compute O-D matrices related to a specific Region of Interest is based on submitting questionnaires to, or performing interviews with inhabitants of the Region of Interest and/or to inhabitants of the neighboring areas about their habits in relation to their movements, and/or by installing vehicle count stations along routes of the area of interest for counting the number of vehicles moving along such routes. The Applicant has observed that this method has very high costs and it requires a long time for collecting a sufficient amount of empirical data. Due to this, O-D matrices used to perform traffic analysis are built seldom, possibly every several years, and being referred to relatively old data they already are, or quickly become, obsolete.

In the art, several alternative solutions have been proposed for collecting empirical data used to compute O-D matrices.

For example, U.S. Pat. No. 5,402,117 discloses a method for collecting mobility data in which, via a cellular radio communication system, measured values are transmitted from vehicles to a computer. The measured values are chosen so that they can be used to determine O-D matrices without infringing upon the privacy of the users.

In Chinese Patent Application No. 102013159 a number plate identification databased area dynamic origin and destination (OD) data acquiring method is described. The dynamic OD data is the dynamic origin and destination data, wherein 0 represents origin and D represents destination. The method comprises the steps of: dividing OD areas according to requirements, wherein the minimum time unit is 5 minutes; uniformly processing data of each intersection in the area every 15 minutes by a traffic control center; detecting number plate data; packing the number plate identification data; uploading the number plate identification data to the traffic control center; comparing a plate number with an identity (ID) number passing through the intersections; acquiring the time of each vehicle passing through each intersection; acquiring the number of each intersection in the path through which each vehicle passes from the 0 point to the D point by taking the plate number as a clue; sequencing the intersections according to time sequence and according to the number of the vehicles which pass through between the nodes calculating a dynamic OD data matrix.

WO 2007/031370 relates to a method for automatically acquiring traffic inquiry data, e.g. in the form of an O-D matrix, especially as input information for traffic control systems. The traffic inquiry data are collected by means of radio devices placed along the available routes.

Nowadays, mobile phones have reached a thorough diffusion among the population of many countries, and mobile phone owners almost always carry their mobile phone with them. Since mobile phones communicates with a plurality of base stations of the mobile phone networks, and each base station operates over a predetermined geographic area (or cell) which is known to the mobile phone network, mobile phones result to be optimal candidates as tracking devices for collecting data useful for performing traffic analysis. For example, N. Caceres, J. Wideberg, and F. Benitez "Deriving origin destination data from a mobile phone network", Intelligent Transport Systems, IET, vol. 1, no. 1, pp. 15-26, 2007, describes a mobility analysis simulation of moving vehicles along a highway covered by a plurality of GSM network cells. In the simulation the entries of O-D matrices are determined by identifying the GSM cells used by the mobile phones in the moving vehicles for establishing voice calls or sending SMS.

US 2006/0293046 proposes a method for exploiting data from a wireless telephony network to support traffic analysis. Data related to wireless network users are extracted from the wireless network to determine the location of a mobile station. Additional location records for the mobile station can be used to characterize the movement of the mobile station: its speed, its route, its point of origin and destination, and its primary and secondary transportation analysis zones. Aggregating data associated with multiple mobile stations allows characterizing and predicting traffic parameters, including traffic speeds and volumes along routes.

In F. Calabrese et al. "Estimating Origin-Destination Flows Using Mobile Phone Location Data", IEEE Pervasive, pp. 36-44, October-December 2011 (vol. 10 no. 4), a further method is proposed that envisages to analyze position variations of mobile devices in a respective mobile communication network in order to determine entries of O-D matrices.

WO 2014/067668 proposes a method and apparatus for handling location data in a mobile communications network. A network node obtains an average geographical location of a mobile device over a predetermined time period and uses the average geographical location in an area of interest in an Origin Destination matrix. The advantage of using an average geographical location over a period of time is that much less data needs to be stored compared to storing all geographical data, but the data can be reused to define new Origin Destination matrices.

U.S. Pat. No. 8,532,648 proposes a method that comprises the steps of: receiving user IDs, cell IDs and time stamps associated with the cell IDs and the user IDs; requesting and receiving, from a cell ID database, geographical coordinates corresponding to the cell IDs; finding stations and times for each user ID based on, at least in part, the geographical coordinates and time stamps associated with each user ID; exchanging the stations with a place for each one of the stations; generating at least one OD sub-matrix associated with each user ID based on, at least in part, places and times of arrival and departure associated with these places; and merging the OD matrices into an OD matrix.

A peculiar type of O-D matrix is the so-called 'commuting matrix' which accounts for home place/work place and viceversa movements.

In M. Nanni, R. Trasarti, B. Furletti, L. Gabrielli, P. Van Der Mede, J. De Bruijn, E. De Romph, G. Bruil, "Transportation planning based on GSM traces: a case study on Ivory Coast", Citizen in Sensor Networks, Second International Workshop, CitiSens 2013, Barcelona, Spain, Sep. 19, 2013, an analysis process that exploits mobile phone transaction (trajectory) data to infer a transport demand model for the territory under monitoring is discloses. In particular, long-term analysis of individual call traces are performed to reconstruct systematic movements, and to infer an origin-destination matrix. The case study includes the exploitation of the inferred mobility demand model in the construction of a transport model that projects the demand onto the transportation network (obtained from open data), and thus allows an understanding of current and future infrastructure requirements of the country.

WO 2014/012927 discloses a method and a system for the construction of model behaviors related to commuting patterns, computer programs thereof and a use for design of transport routes and/or estimation of traffic. The method comprising using a computing device for constructing a commuting matrix according to location data extracted from call records of a user, said method comprising following steps: a) providing a user's origin time range; b) providing at least a user's destination time range or second user's origin time range; c) constructing said commuting matrix, using a temporal association rules based algorithm, based on location data extracted from call records using said user's origin time range and said user's destination time range; d) comparing said commuting matrix with a predetermined ground truth matrix and obtaining at least one comparison result therefrom; and e) optimizing at least said origin time range and/or destination time range based on said at least one comparison result.

In S. Isaacman et al., "Identifying Important Places in People's Lives from Cellular Network Data", in Pervasive Computing, Vol. 6696, pp. 133-151, June 2011 techniques based on clustering and regression for analyzing anonymized cellular network data to identify generally important locations, and to discern semantically-meaningful locations such as home and work are disclosed. Starting with temporally sparse and spatially coarse location information, an algorithm to identify important locations is described. Algorithm was tested on arbitrary cellphone users, including those with low call rates. Further, after locating home and work, commute distance estimates are performed.

In Md. S. Iqbal, C. F. Choudhury, Pu Wang, and M. C. Gonzalez, "Development of Origin-Destination Matrices Using Mobile Phone Call Data", Transportation Research C, Vol. 40, Pages 63-74, 2014 a methodology to develop OD matrices using mobile phone Call Detail Records (CDR) and limited traffic counts is disclosed. CDR, which consist of time stamped tower locations with caller IDs, are analyzed first and trips occurring within certain time windows are used to generate tower-to-tower transient OD matrices for different time periods. These are then associated with corresponding nodes of the traffic network and converted to node-to-node transient OD matrices. The actual OD matrices are derived by scaling up these node-to-node transient OD matrices. An optimization based approach, in conjunction with a microscopic traffic simulation platform, is used to determine the scaling factors that result best matches with the observed traffic counts.

U.S. Pat. No. 8,560,361 describes a travel information server that estimates travel demand with mobility data. The server identifies activity types of users based, at least in part, on mobility data of the users. The mobility data has been collected over time and indicates at least locations and corresponding times at the locations. Travel information is generated with the mobility data for each of the activity types. The travel information for a first of the activity types is adjusted based, at least in part, on travel-related event data that corresponds to the first activity type to generate an adjusted travel information for the first activity type. The travel-related event data indicates an event that potentially influences travel for a short term computing an estimated travel demand with a combination of the adjusted travel information for the first activity type and the travel information for at least a second of the activity types.

SUMMARY OF THE INVENTION

The Applicant has perceived a general lack of manageability in the use of the large amount of empirical data collected by means of the systems and methods known in the art in order to perform a traffic analysis in a Region of Interest capable of identifying a purpose which caused each movement, also in case of movements performed with a low periodicity.

The Applicant has observed that, generally, the expedients known in the art are able to identify substantially only locations frequented with a high periodicity (i.e., daily or even more often) by people, usually corresponding to their home places or work places.

In particular, the Applicant has observed that known expedients are not able to identify a location type of the locations frequented with a low periodicity, or they require an extensive and time-consuming a posteriori analysis and elaboration of data regarding movements for estimating the type of a considered location.

Moreover, the Applicant observed that known expedients are not able to provide any indication of a purpose that caused a movement to a certain location.

The Applicant has therefore tackled the problem of how to manage, in an efficient way, the large amount of empirical data provided by a (at least one) radio mobile network for computing in a fast and reliable way possibly distinct sets of one or more O-D matrices accounting for movements within a Region of Interest providing an indication of a purpose of the movements identified, even in the case of movements performed with a low frequency (i.e., movements associated with location types frequented with a low periodicity).

Particularly, one aspect of the present invention proposes a method of managing data regarding one or more flows of physical entities in a geographic area during at least one predetermined time period. It is considered that, for each physical entity, the data comprise a plurality of positioning data representing detected positions of the element in said geographic area and corresponding time data identifying instants at which each position is detected. The method comprises the steps of: subdividing the geographic area into at least two zones; subdividing the at least one time period into one or more time slots; identifying a number of physical entities that flowed from a first zone of the at least two zones to a second zone of the at least two zones during each time slot, and computing an Origin-Destination matrix for each time slot of the one or more time slots based on such identifying, each Origin-Destination matrix comprising a respective row for each one of the at least two zones where the flow of the physical entities may have started and a respective column for each one of the at least two zones where the flow of the physical entities may have ended during the corresponding time slot, and each entry of the Origin-Destination matrix being indicative of the number of physical entities that, during the corresponding time slot, flowed from the first zone to the second zone. The step of identifying a number of physical entities that flowed from the first zone to the second zone during each time slot comprises, for each physical entity, identifying a purpose of movement among predetermined purposes of movement which caused the physical entity flowing from the respective first zone to the respective second zone on the basis of an analysis of said data. Moreover, for each purpose of movement identified, the step of computing an Origin-Destination matrix comprises calculating an indication of a number of physical entities that, during the corresponding time slot, flowed from the first zone to the second zone for a same purpose of movement.

The step of identifying a number of physical entities that flowed from a first zone of the at least two zones to a second zone of the at least two zones during each time slot further comprises: obtaining a first indication of a location in which each physical entity is located within the first zone, the first indication of a location comprising a first location type associated with said location; obtaining a second indication of a location in which each physical entity is located within the second zone, the second indication of a location comprising a second location type associated with said location, and associating a predetermined purpose of movement to the first and second indication of a location on the basis of the first location type and second location type, respectively.

Preferred features of the present invention are set in the dependent claims.

In one embodiment of the present invention, the step of, for each physical entity, identifying a purpose of movement which caused the physical entity flowing from a respective first zone of the at least two zones to a respective second zone of the at least two zones comprises identifying the purpose of movement as the predetermined purpose of movement associated with the second zone of the at least two zones.

In one embodiment of the present invention, the steps of obtaining a first indication of a location in which each physical entity is located within the first zone of the at least two zones, and of obtaining a second indication of a location in which each physical entity is located within the second zone comprise: for each physical entity either located within the first zone or in the second zone, clustering data in clusters according to a compliance with corresponding predetermined spatial and time parameters; associating clusters with a respective location type on the basis of said predetermined spatial and time parameters, and setting the respective location type as the first indication of a location or as the second indication of a location.

In one embodiment of the present invention, the step of associating clusters with a respective predetermined location type comprises: for each cluster, evaluating a probability that the data comprised in the cluster are associated with at least one predetermined location type, and associating the cluster with a respective predetermined location type on the basis of said probability.

In one embodiment of the present invention, the data are organized in events comprising a respective positioning datum and a respective time datum, and the step of computing an Origin-Destination matrix for each time slot of the one or more time slots further comprises: for each event in a cluster, determining a set of parameters, preferably comprising: an indication of the purpose of movement, an indication of a location position associated with the cluster, a location time during which the physical entity associated with the event is in the location corresponding to the indication a location position, and an indication of a frequency with which events of the cluster are associated with the location position, and providing an indication of the number of physical entities that, during the corresponding time slot, flowed from the first zone to the second zone for a same purpose of movement by comparing sets of parameters of events having consecutive time instants.

In one embodiment of the present invention, the step of, for each event in a cluster, determining a set of parameters comprises computing a normalized frequency distribution of an occurrence of events comprised in the cluster as a function of an event time interval comprised in a considered periodicity interval, and determining the location time on the basis of said normalized frequency distribution.

In one embodiment of the present invention, computing a normalized frequency distribution in function comprises computing a sum of a number of occurrences of the event during corresponding event time intervals comprised in the considered periodicity interval weighted by a probability that the event occurred in the location type associated with the cluster.

In one embodiment of the present invention, determining the location time on the basis of said normalized frequency distribution comprises computing the location time as a mean value of the normalized frequency distribution.

In one embodiment of the present invention, event time intervals are selected shorter than the time slots.

In one embodiment of the present invention, the step of providing an indication of the number of physical entities that, during the corresponding time slot, flowed from the first zone to the second zone for a same purpose of movement by comparing sets of parameters of events having consecutive time instants comprises determining a flow of a physical entity from the first zone to the second zone when sets of parameters of events having consecutive time instants comprise different respective indications of a location position.

In one embodiment of the present invention, the step of computing an Origin-Destination matrix for each time slot of the one or more time slots comprises subdividing each entry of the Origin-Destination matrix in at least two sub-entries, each sub-entry providing an indication of the number of physical entities that, during the corresponding time slot, flowed from the first zone to the second zone, for a same purpose of movement.

In one embodiment of the present invention, the step of computing an Origin-Destination matrix for each time slot of the one or more time slots comprises subdividing the Origin-Destination matrix in at least two Origin-Destination sub-matrices, the entries of each Origin-Destination sub-matrices providing an indication of the number of physical entities that, during the corresponding time slot, flowed from the first zone to the second zone for a same purpose of movement.

In one embodiment of the present invention, the step of providing an indication of the number of physical entities that, during the corresponding time slot, flowed from the first zone to the second zone for a same purpose of movement comprises increasing a selected sub-entry of the entry of the O-D matrix by a value computed on the basis of the indication of a frequency with which events of the cluster are associated with the location type, or increasing a selected entry of the O-D sub-matrix of the O-D matrix by a value computed on the basis of the indication of a frequency with which the event is associated with the location type.

Another aspect of the present invention proposes a system coupled with a wireless telecommunication network for managing data regarding one or more flows of physical entities in a geographic area during at least one predetermined time period, the system comprising a computation engine adapted to process data retrieved from a mobile telephony network; a repository adapted to store data regarding interactions between the User Equipment and the mobile telephony network, computation results generated by the computation engine and, possibly, any processing data generated by and/or provided to the system, and an administrator interface operable for modifying parameters and/or algorithms used by the computation engine and/or accessing data stored in the repository. The system further comprises a memory element storing a software program product configured for implementing the method of above.

In one embodiment of the present invention, the system further comprises at least one user interface adapted to receive inputs from, and to provide output to a user of the system, the user comprising one or more human beings and/or one or more external computing systems subscriber of the services provided by the system.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIGS. 7A-7C are a schematic flowchart of a method for computing O-D matrices accounting for movements and respective movement purposes according to an embodiment of the invention;

FIGS. 9A-9G are examples of a weekly set of probability functions representing the probability over time that an individual is at an entertainment location.

DETAILED DESCRIPTION OF THE INVENTION

Figure 1:
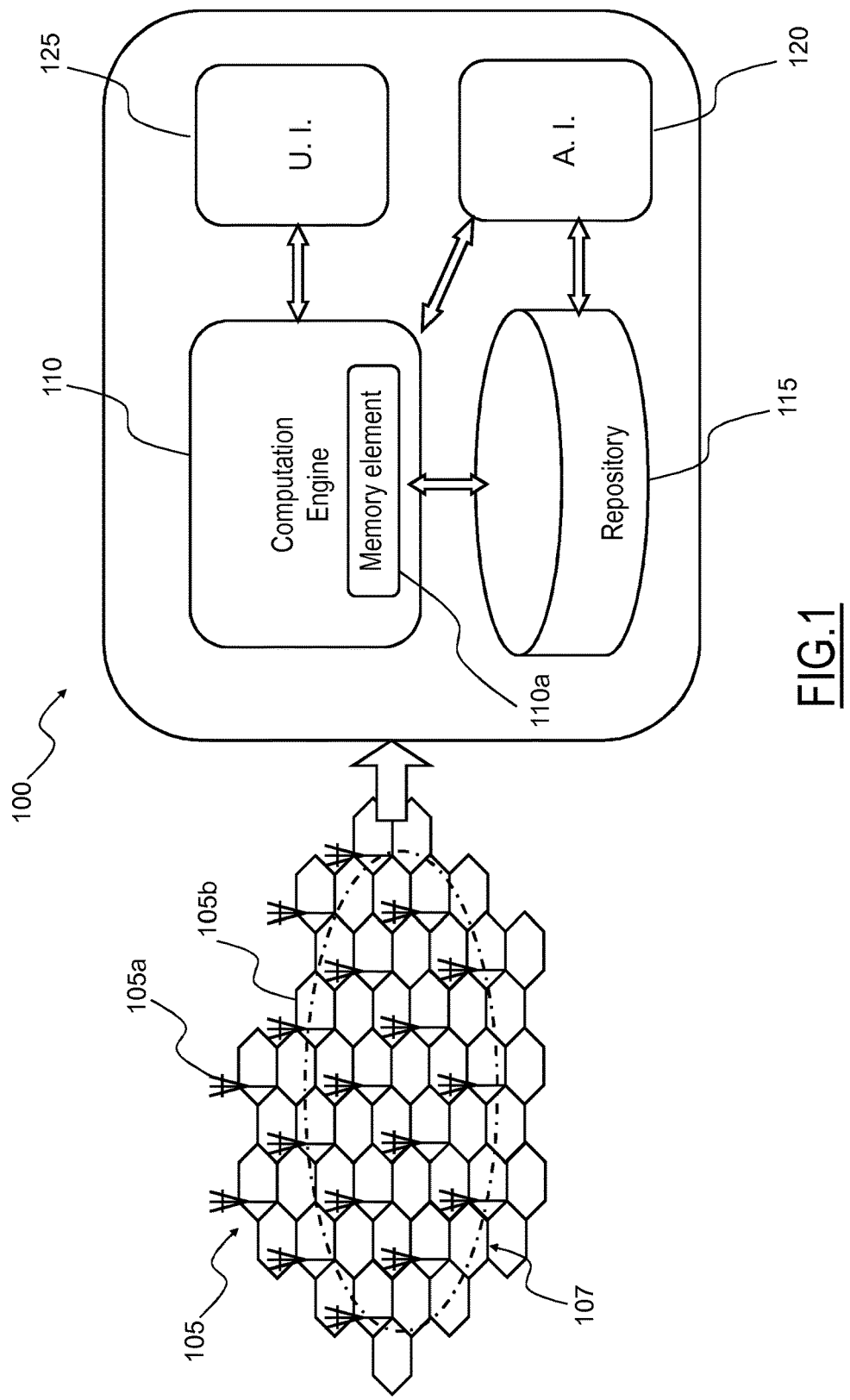
FIG. 1 is a schematic representation of a system for identifying movements and a purpose associated with said movements and for computing O-D matrices indicating a purpose of the movement.

With reference to the drawings, FIG. 1 is a schematic representation of a system for identifying movements and a purpose associated with such movements, and for computing O-D matrices which indicate a purpose associated with movements, simply denoted as system 100 hereinafter, according to an exemplary embodiment of the present invention.

The system 100 allows performing an estimation of movements performed by observed people, both movements performed frequently, e.g. daily (such as for example home place/work place and vice-versa movements) and movements performed with a lower frequency, e.g. once or twice a week (such as for example movements towards a gym, a restaurant, a shopping mall, etc.).

In an embodiment of the invention, the system 100 is further arranged for identifying a purpose (i.e., indicating why each observed person performed a specific movement) associated with a movement (e.g., family purpose, work purpose, entertainment purpose, shopping purpose, etc.), thus allows computing corresponding O-D matrices in which movements between pairs of zones are subdivided on the basis of the purpose that lead to perform the corresponding movement.

Alternatively or in addition, the system 100 may be arranged for computing one or more different sets of O-D matrices, where each set of O-D matrices is referred to a respective purpose. In other words, the O-D matrices of a set are referred to movements due to a common purpose (e.g., family purpose matrices, work purpose matrices, entertainment purpose matrices, shopping purposes matrices, etc.).

The system 100 is coupled with a mobile communication network 105, such as a (2G, 3G, 4G or higher generation) mobile telephony network, and is configured for receiving from the mobile communication network 105 positioning data of each User Equipment (UE in the following, e.g. a mobile phone, a smartphone, a tablet with 2G-3G-4G connectivity, etc.) of individuals located in a surveyed geographic area 107, schematized in FIG. 1 as the area within the dash-and-dot line (e.g., a city, a municipality, a district, etc.).

The mobile communication network 105 comprises a plurality of (two or more) communication stations 105a (e.g., radio base stations of the mobile telephony network) geographically distributed in the surveyed area 107. Each communication station 105a is adapted to manage communications of UE (not shown, such as for example mobile phones) in one or more served areas or cells 105b (in the example at issue, three cells are served by each communication station 105a) as will be discussed in greater detail below.

Even more generally, each communication station 105a of the mobile communication network 105 is adapted to interact with any UE located within one of the cells 105b served by such communication station 105a (e.g., interactions at power on/off, at location area update, at incoming/outgoing calls, at sending/receiving SMS and/or MMS, at Internet access etc.). Such interactions between UE and mobile communication network 105 will be generally denoted as events $e_v$ (v=1, . . . , V; V>0) in the following.

It should be apparent that the surveyed geographic area 107 may be regarded as subdivided in a plurality of sectors, each corresponding to a respective cell 105b of the (part of the) mobile telephony network 105 superimposed on the surveyed area 107.

The system 100 comprises a computation engine 110 configured to be adapted to process data retrieved from the mobile communication network 105, and a repository 115 (such as a database, a file system, etc.) configured to be adapted to store data regarding interactions between the UE and the mobile communication network 105, computation results generated by the computation engine 110 and, possibly, any processing data generated by and/or provided to the system 100 (generally in a binary format). The system 100 is provided with an administrator interface 120 (e.g., a computer) configured and operable for modifying parameters and/or algorithms used by the computation engine 110 and/or accessing data stored in the repository 115.

Preferably, the system 100 comprises one or more user interfaces 125 (e.g., a user terminal, a software running on a remote terminal connected to the system 100) adapted to receive inputs from, and to provide output to a user of the system 100. The term "user of the system" as used in the present disclosure may refer to one or more human beings and/or to external computing systems (such as a computer network, not shown) of a third party being subscriber of the services provided by the system 100 and enabled to access the system 100—e.g., under subscription of a contract with a service provider owner of the system 100, and typically with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115, connected to other machines implementing administrator and user interfaces 120 and 125) or of virtual type (e.g., by implementing one or more virtual machines in a computer network).

The system 100 is adapted to retrieve (and/or receive) an event record ery (v=1, . . . , V; V positive integer) for each event $e_v$ occurred between a UE and the mobile communication network 105 (through one of its communication stations 105a) within the surveyed geographic area 107. Preferably, each event record ery retrieved by the system 100 from the mobile communication network 105 comprises—in a non-limitative manner—an identifier of the UE that is involved in the corresponding event $e_v$ (e.g., the UE identifier may be selected as one or more among the International Mobile Equipment Identity—IMEI, the International Mobile Subscriber Identity—IMSI and the Mobile Subscriber ISDN Number—MSISDN code), time data (also denoted as timestamps) indicating the time at which the corresponding event $e_v$ has occurred, and UE geographical position data, e.g. spatial indications based on the cell 105b in which the UE is located at the time of occurrence of the corresponding event $e_v$.

In one embodiment of the present invention, the UE identifier of the UE involved in the event record ery may be provided as encrypted information in order to ensure the privacy of the UE owner. Anyway, if the need arises, the encrypted information (i.e., the identity of the owner of the UE corresponding to the UE identifier) may be decrypted by implementing a suitable decryption algorithm, such as for example the algorithm SHA256 described in "Secure Hash Standard (SHS)", National Institute of Standards and Technology FIPS—180-4, Mar. 6, 2012.

The system 100 may retrieve (and/or receive) the event records ery related to a generic UE from the mobile communication network 105 by acquiring records of data generated and used in the mobile communication network 105. For example, in case the mobile communication network 105 is a GSM network, Charging Data Records (CDR), also known as call data records, and/or Visitor Location Records (VLR) may be retrieved from the mobile communication network 105 and reused as event records $er_v$. The CDR is a data record (usually used for billing purposes by a mobile telephony service provider operating through the mobile communication network 105) that contains attributes specific to a single instance of a phone call or other communication transaction performed between a UE and the mobile communication network 105. The VLR are databases listing UE that have roamed into the jurisdiction of a Mobile Switching Center (MSC, not shown) of the mobile communication network 105, which is a management element of the mobile communication network 105 managing events over a plurality of communication stations 105a. Each communication station 105a in the mobile communication network 105 is usually associated with a respective VLR.

Conversely, if the mobile communication network 105 is a LTE network, records of data associated with the event records ery of a generic UE are generated by a Mobility Management Entity, or MME, comprised in the mobile communication network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records ery comprising a univocal identifier of individuals (such as the UE identifier mentioned above), a location position of such individuals, and a time indication of an instant during which such event has occurred.

In operation, event records ery may be continuously retrieved by the system 100 from the mobile communication network 105. Alternatively, event records ery may be collected by the system 100 periodically, e.g. for a predetermined time period (e.g., every certain number of hours, on a daily or weekly basis). For example, event records ery may be transferred from the mobile communication network 105 to the system 100 as they are generated, in a sort of "push" modality, or event records ery may be collected daily in the mobile communication network 105 and then packed and transferred to the system 100 periodically or upon request by the system 100.

The event records ery retrieved from the mobile communication network 105 are stored in the repository 115, where they are made available to the computation engine 110 for processing. Preferably, event records ery generated by a same UE are grouped together in the repository 115, i.e. event records ery are grouped together if they comprise a common UE identifier and are denoted to as event records group ergs (e.g., n=0, ..., N, N≥0) hereinafter.

Preferably, the computation engine 110 processes an algorithm for identifying and analyzing the traffic flows of people (described in the following) implemented by a software program product stored in a memory element 110a of the system 100, comprised in the computation engine 110 in the example of FIG. 1, even though the software program product could be stored in the repository 115 as well (or in any other memory element provided in the system 100).

Even more preferably, the event records ery are processed according to (as discussed in detail below) instructions provided by the system administrator (through the administrator interface 120), for example stored in the repository 115, and, possibly, according to instructions provided by a user (through the user interface 125).

Finally, the computation engine 110 provides the results of the processing performed on the event records ery to the user through the user interface 125, and optionally stores such processing results in the repository 115.

It should be noted that the system 100 might be adapted to retrieve (or receive) data about individuals not exclusively from a mobile telephony network 105. Alternatively or in addition, the system may be configured to retrieve (or receive) data about individuals from one or more wireless computer networks, such as WLANs, operating in the surveyed area 107, provided that the UE of the individuals are capable to connect to such wireless computer networks.

Figure 2:
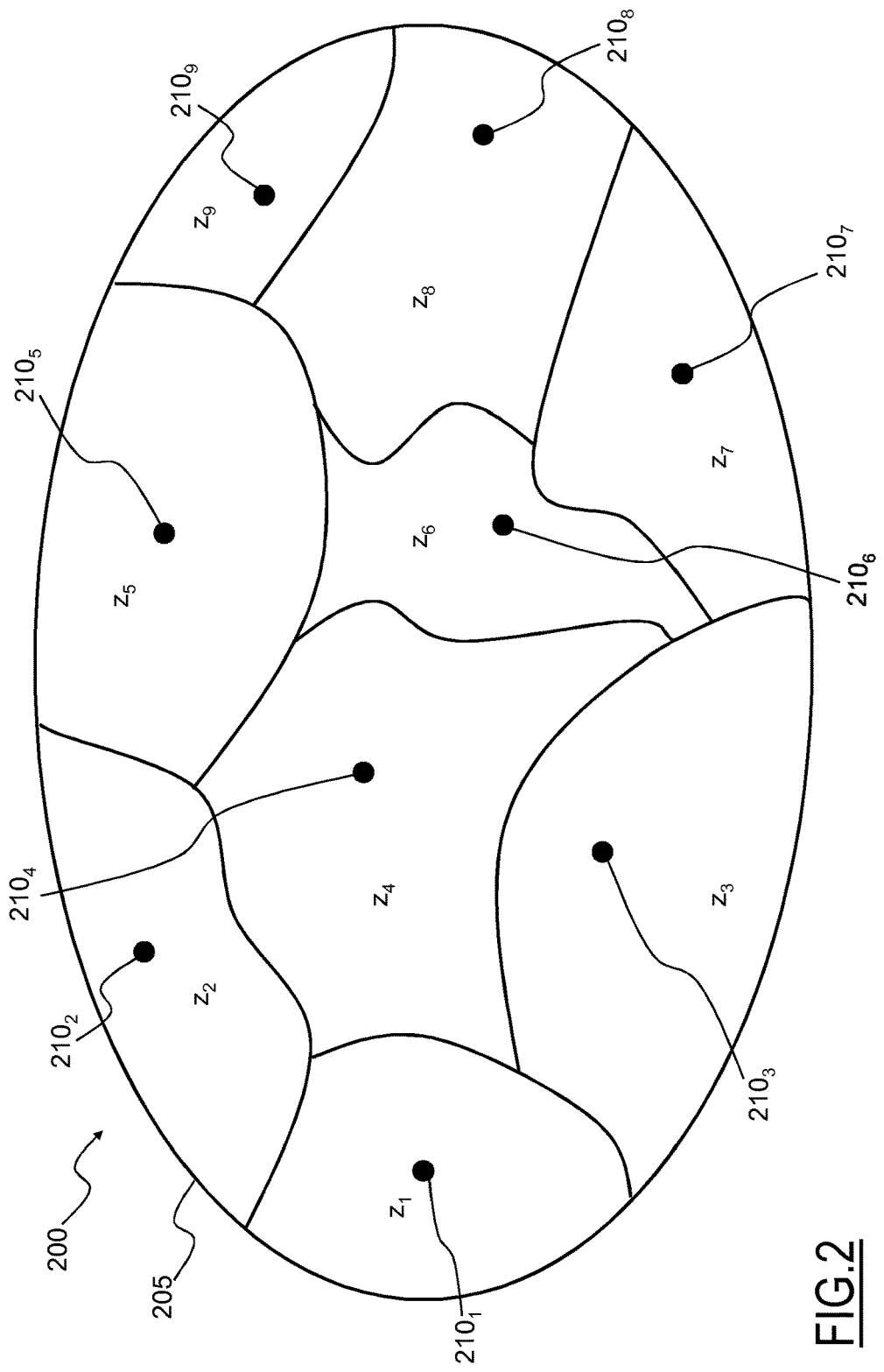
FIG. 2 is a schematic view of a geographic Region of Interest for performing a traffic analysis of physical entities (e.g., vehicles), the geographic area of interest being subdivided into a plurality of zones.

FIG. 2 is a schematic view of the surveyed geographic area 107, in the following simply denoted ad Region of Interest (RoI) 200.

The RoI 200 is a geographic region within which a traffic analysis is performed in order to compute O-D matrices according to an embodiment of the present invention. For example, the RoI 200 may be either a district, a town, a city, or any other kind of geographic area. Moreover, the RoI 200 may comprise a number of sub-regions having non-adjacent geographical locations, such as for example a plurality of different cities, different counties and/or different nations (and so on). In addition, the RoI 200 may comprise a set of one or more predetermined locations (such as for example airports, bus/train stations, etc.).

Let be assumed, as non-limiting example, that a traffic analysis (e.g., an analysis of people flow) over the RoI 200 is performed in order to identifying movements of people and for computing O-D matrices referred to the movements of people identified by the traffic analysis.

The RoI 200 is delimited by a boundary, or external cordon 205. The RoI 200 is subdivided into a plurality of traffic analysis zones, or simply zones $z_q$ (q=1, ..., Q; where Q is an integer number, and Q>0) in which it is desired to analyze traffic flows. In the example shown in FIG. 2, the RoI 200 is subdivided into nine zones $z_1, \ldots, z_9$ (i.e., Q=9).

Each zone $z_q$ may be advantageously determined by using the already described zoning technique. According to this technique, each zone $z_q$ may be delimited by administrative (city limits, National boundaries, etc.) and/or physical barriers (such as rivers, railroads etc.) within the RoI 200 that may hinder the traffic flow and may comprise adjacent lots of a same kind (such as open space, residential, agricultural, commercial or industrial lots) which are expected to experience similar traffic flows. It should be noted that the zones $z_q$ may differ in size one another. Generally, each zone $z_q$ is modeled as if all traffic flows starting or ending therein were concentrated in a respective single point or centroid $210_q$ (i.e., $210_1, \ldots, 210_9$). In other words, the centroid $210_q$ of the generic zone $z_q$ represents an ideal hub from or at which any traffic flow starts or ends, respectively.

Anyway, it is pointed out that the solution according to embodiments of the present invention is independent from the criteria used to partition the RoI 200 into zones $z_q$.

Figure 3:
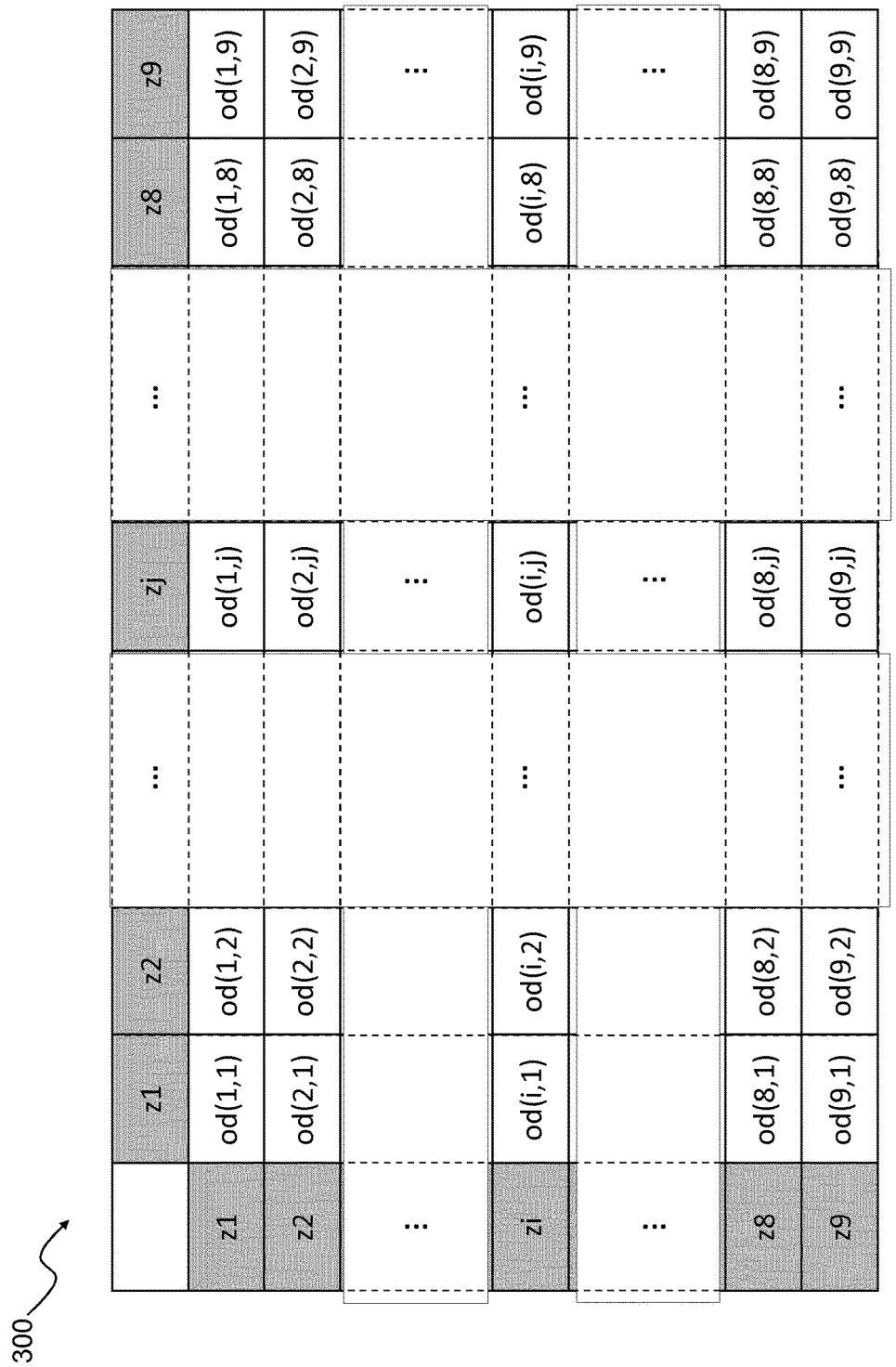
FIG. 3 shows a generic O-D matrix related to the geographic Region of Interest of FIG. 2, corresponding to a certain time slot of an observation period.

In FIG. 3, an O-D matrix 300 associated with the RoI 200 is depicted. The O-D matrix 300 is referred to a respective time interval or time slot is of an observation time period TP, as described in greater detail in the following.

The generic O-D matrix 300 is typically a square matrix having Q rows i and Q columns j. Each row and each column are associated with a corresponding zone $z_q$ of the RoI 200; thus, considering the RoI 200 in the example of FIG. 2, the corresponding O-D matrix 300 comprises nine rows i=1, ..., 9 and nine columns j=1, ..., 9.

Each row i represents an origin zone $z_i$ for traffic flows of moving physical entities (for example land vehicles) while each column j represents a destination zone $z_j$ for traffic flows of such moving physical entities. In other words, each generic element or entry od(i,j) of the O-D matrix 300 represents the number of traffic flows starting in the zone $z_i$ (origin zone) and ending in the zone $z_j$ (destination zone) in the corresponding time slot.

The main diagonal of the O-D matrix 300, which comprises the entries od(i,j) having i=j (i.e., entries od(i,j) having the same zone $z_i$ both as origin and destination zone), is usually left empty (e.g., with values set to 0) or the values of the main diagonal entries od(i,j) are discarded since they do not depict a movement between zones of the region of interest (i.e., such entries do not depict a flow of people).

As outlined above, in order to obtain a more detailed and reliable traffic analysis, a predetermined observation time period TP of the traffic flows in the region of interest is also established and it is subdivided into one or more (preferably a plurality) of time slots $ts_m$ (m=1, M, where M is an integer number, and M>0). Each time slot $ts_m$ ranges from an initial instant $t_{0(m)}$ to a next instant $t_{0(m+1)}$ (excluded) which is the initial instant of the next time slot $ts_{m+1}$, or:

$$ts_m = [t_{0(m)}, t_{0(m+1)}].\tag{1}$$

Anyway, embodiments of the present invention featuring overlapping time slots are not excluded. Also, the time slots $ts_m$ into which the observation period is subdivided may have different lengths from one another.

Figure 4:
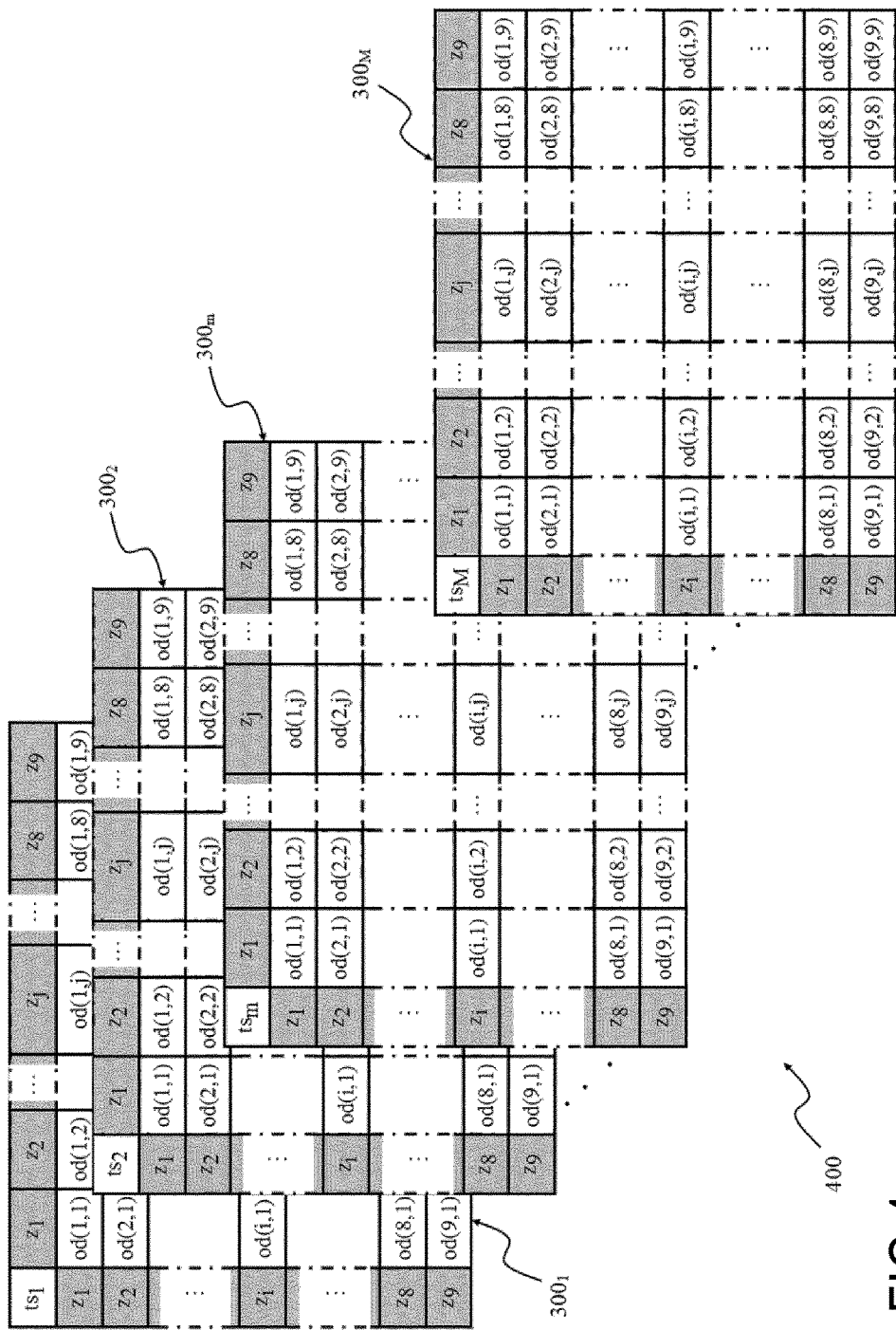
FIG. 4 shows a set of O-D matrices, of the type shown in FIG. 3, each referred to a respective one of a plurality of time slots making up the observation period, and used for performing a traffic analysis.

For each one of the time slots $ts_m$ a respective O-D matrix 300m is computed that accounts for the movements that have taken place during the time slot $ts_m$. Therefore, a sequence or O-D set 400 of M O-D matrices 300m, as shown in FIG. 4, is obtained that provides information of movements of people from/to each one of the different zones $z_q$ of the RoI 200.

In one embodiment of the invention, commonly used values to which the observation time period TP and the time slots $ts_m$ are set correspond to 24 hours and 1 hour, respectively.

Naturally, the scope of the present invention is not limited by any specific values selected for the observation time period TP and the time slots $ts_m$.

The computing of the O-D matrices 300m is now described.

For any pair of consecutive distinct location positions $pos_k$ and $pos_{k+1}$ of a same UE referred to two subsequent times $t_k$ and $t_{k+1}$ within the observation period TP and each one associated with a respective zone $z_i$ and $z_j$, a movement of the UE owner is identified.

If both the event times $t_k$ and $t_{k+1}$ belong to a same time slot $ts_m$ of the observation period TP the entry od(i,j) of the O-D matrix 300m of the set 400 of O-D matrices associated with the time slot $ts_m$ is increased by one unit, i.e. the movement is associated with the O-D matrix 300m.

Conversely, if the event times $t_k$ and $t_{k+1}$ belong to different time slots $ts_m$ and $ts_{m+1}$ substantially three possible options are available for assigning values to the entries od(i,j) in computing the O-D matrices 600m:

1. the entry od(i,j) of the O-D matrix 300m, of the set 400 of O-D matrices, associated with the time slot $ts_m$ is increased by one unit, i.e. the movement is associated with the O-D matrix 300m;

2. the entry od(i,j) of the O-D matrix 300m+1, of the set 400 of O-D matrices, associated with the time slot $ts_{m+1}$ is increased by one unit, i.e. the movement is associated with the O-D matrix 300m+1 or 3. the movement may be distributed between each one of the matrices 300m÷300m+x of the set 400 associated with each one of the time slots $ts_m$÷$ts_{m+x}$ (where x≥1) comprising at least partially a movement time interval [$t_k$, $t_{k+1}$] defined by the event times $t_k$ and $t_{k+1}$. (i.e., the event time $t_k$ occurring during the time slot $ts_m$ and the event time $t_{k+1}$ occurring during the time slot $ts_{m+x}$). Preferably, the movement is associated in a proportional manner to each one of the time slots $ts_m$÷$ts_{m+x}$, and consequently assigned to the corresponding matrices 300m÷300m+x, according to a (time) portion of the movement time interval [$t_k$, $t_{k+1}$] having taken place during each one of the time slots $ts_m$÷$ts_{m+x}$.

For example, by considering two consecutive time slots $ts_m$ and $ts_{m+1}$ comprising the movement time interval [$t_k$, $t_{k+1}$], a first (time) portion of the movement time interval [$t_k$, $t_{k+1}$], e.g. 60% of [$t_k$, $t_{k+1}$], falls in the time slot $ts_m$ while the second (time) portion of the movement time interval [$t_k$, $t_{k+1}$], e.g. the remaining 40% of [$t_k$, $t_{k+1}$], falls in the other time slot $ts_{m+1}$, the entry od(i,j) of the OD matrix 300m is increased by 0.6, while the entry od(i,j) of the other O-D matrix 300m+1 is increased by 0.4.

The first option privileges the initial time ($t_k$) at which a movement is started, the second option privileges instead the final time ($t_{k+1}$) of the movement, while the third option considers the duration of the time interval.

Preferably, the administrator of the system 100 through the administrator interface 120 and/or the user of the system 100 through the user interface 125 may choose among the three options according to their needs.

According to the invention, the entries od(i,j) of the O-D matrices 300m of the set 400 comprise an indication of a purpose of the movement, or movement purpose p, which provide information about a reason that caused a certain number (i.e., the numbers or a fraction of the number comprised in the entries od(i,j) as described in the following) of individuals (UE owners) to move from an origin zone $z_i$ to a destination zone $z_j$.

In an embodiment of the present invention, each entry od(i,j) comprises one or more sub-entries $od^p(i,j)$; each one of the sub-entries $od^p(i,j)$ providing an indication of a number of UE owners that moved from the origin zone $z_i$ to the destination zone $z_j$ for a same movement purpose p.

Preferably, each entry od(i,j) comprises a number of sub-entries $od^p(i,j)$ corresponding to a number of possible movement purposes p predetermined and/or selected by the administrator and/or by a user of the system 100 and each one of the sub-entries $od^p(i,j)$ is associated with a corresponding movement purpose p.

For example, the movement purpose p is represented by a variable (e.g., having an integer value such as for example p=1, . . . , P; P integer) which value indicates a respective purpose for a movement from the origin zone $z_i$ to the destination zone $z_j$.

Therefore, the number of movements indicated by each entries od(i,j) of the O-D matrices 300m, i.e. the total number of UE owners that moved from the origin zone $z_i$ to the destination zone $z_j$, is subdivided among the sub-entries $od^p(i,j)$ according to a respective movement purpose p that caused each UE owner to move from the origin zone $z_i$ to the destination zone $z_j$.

Figure 5:
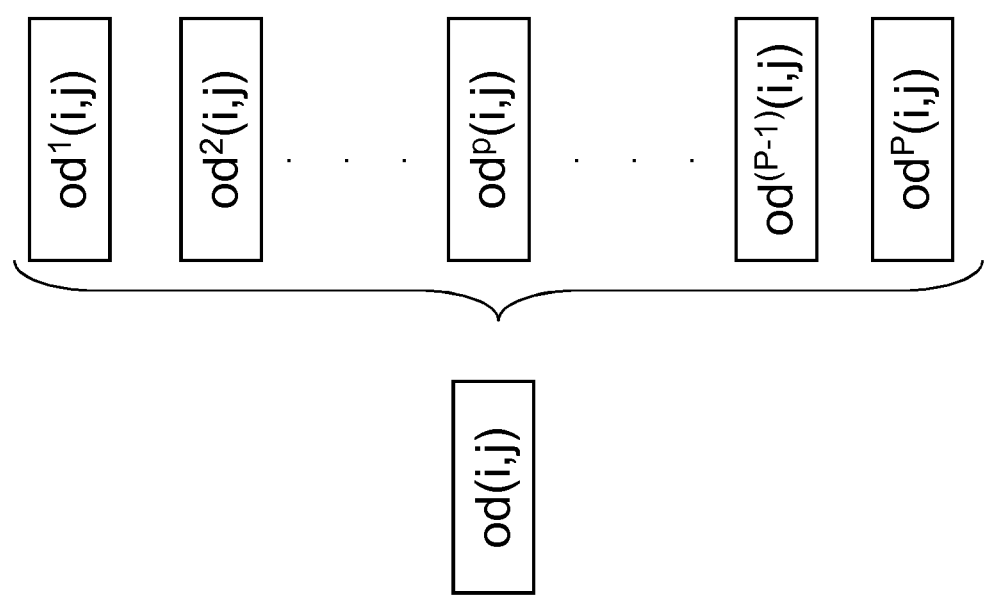
FIG. 5 is a schematic diagram of an entry of an O-D matrix, of the type shown in FIG. 3, comprising a plurality of sub-entries.

With reference to FIG. 5, which is a schematic diagram of an entry od(i,j) of a O-D matrix 300m comprising a plurality of sub-entries $od^p(i,j)$, each sub-entries $od^p(i,j)$ of the generic entry od(i,j) comprises an indication of a number of movements from zone $z_i$ to zone $z_j$ in the time slot $ts_m$ performed for the corresponding movement purpose p.

Figure 6:
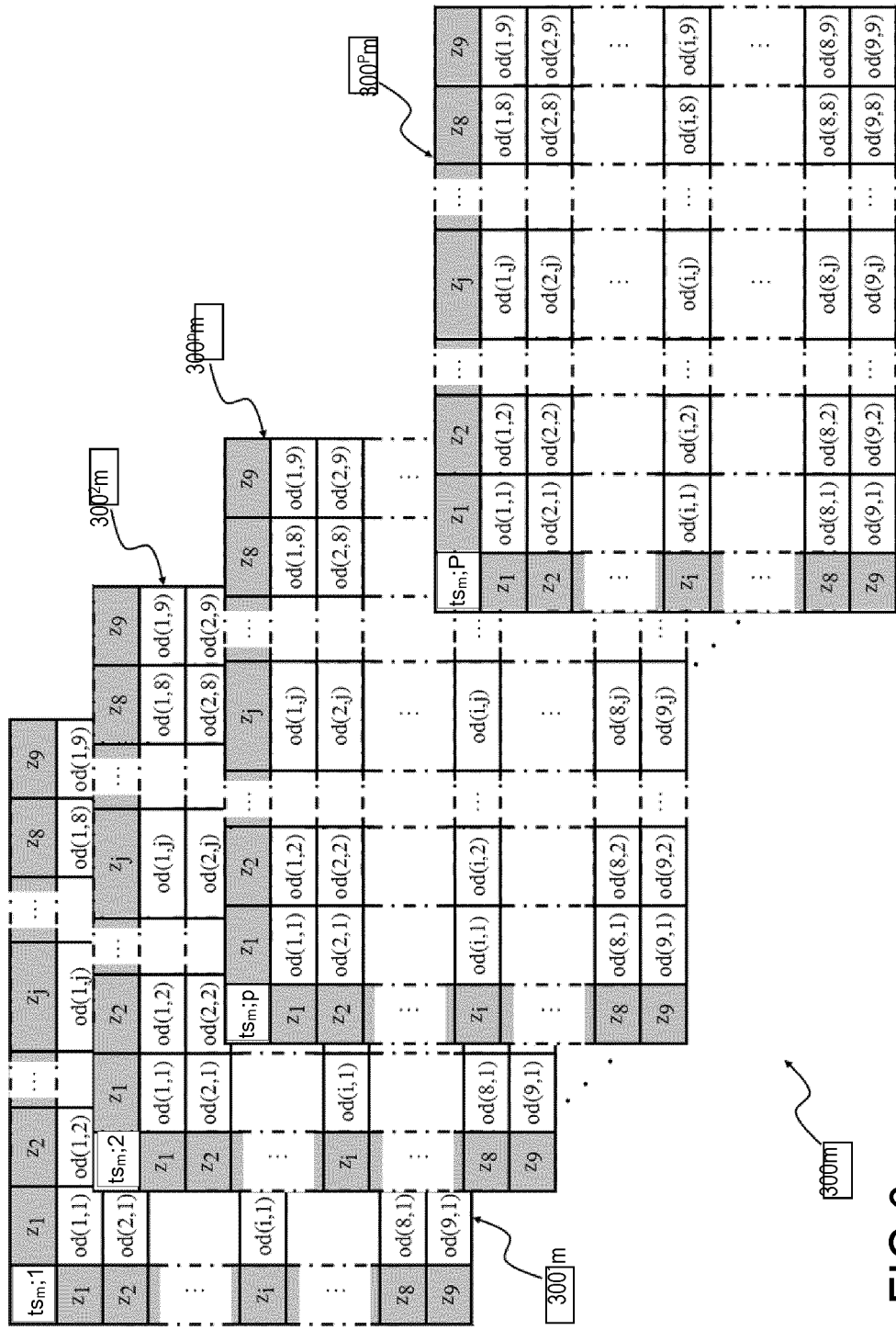
FIG. 6 shows a plurality of O-D sub-matrices associated with an O-D matrix, of the type shown in FIG. 3.

Alternatively or in addition, with reference to FIG. 6, where a plurality of O-D sub-matrices $300m^p$ associated with an O-D matrix 300m are shown, system 100 may be arranged for elaborating one or more 0-D sub-matrices $300m^p$ associated with a corresponding O-D matrix 300m of the set 400. Each O-D sub-matrix $300m^p$ is a matrix accounting for movements between zones $z_q$ of the RoI 200 performed in a respective time slot $ts_m$ for a same purpose p.

Figure 7B:
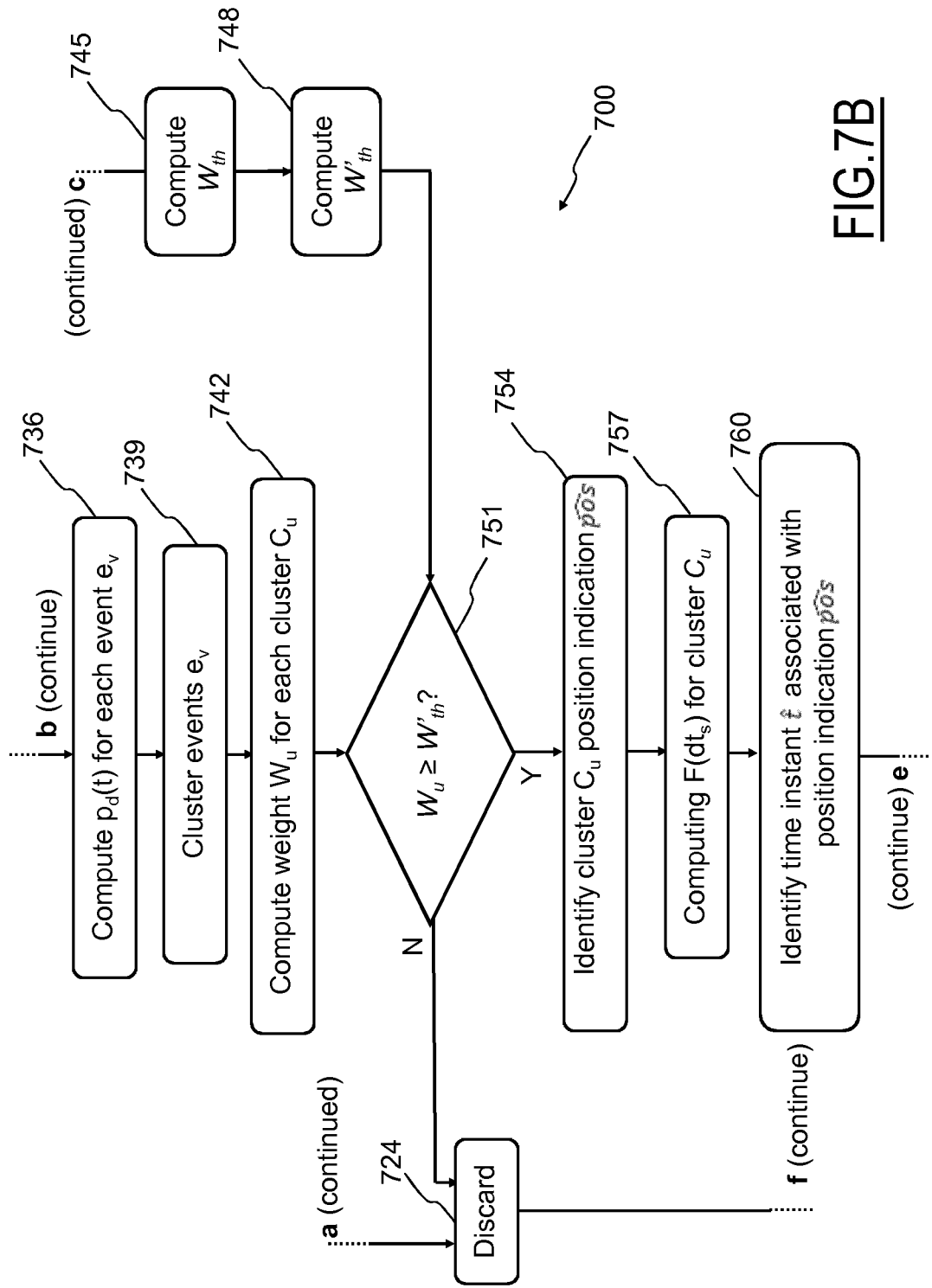
Figure 7C:
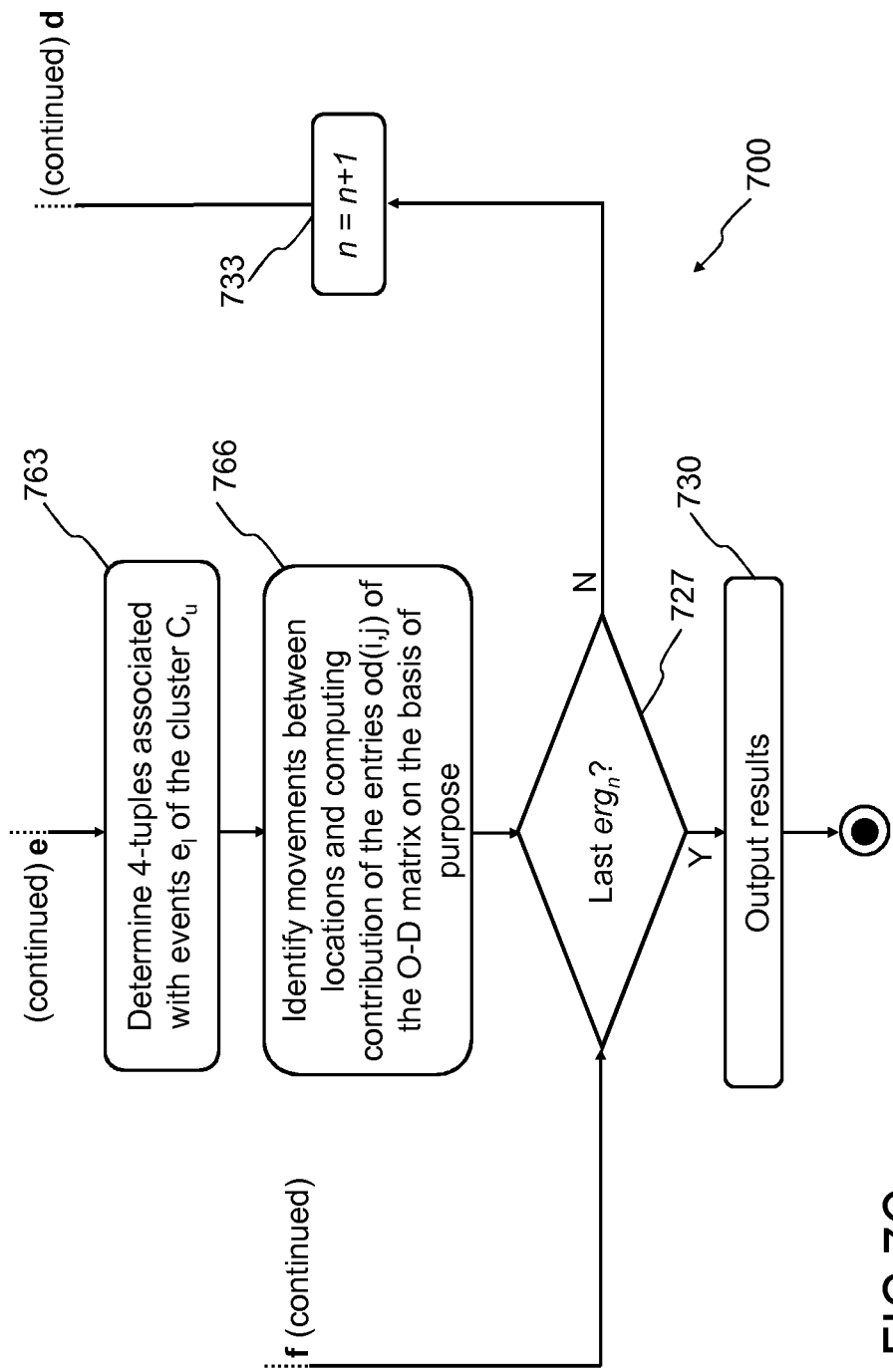
Figure 8A:
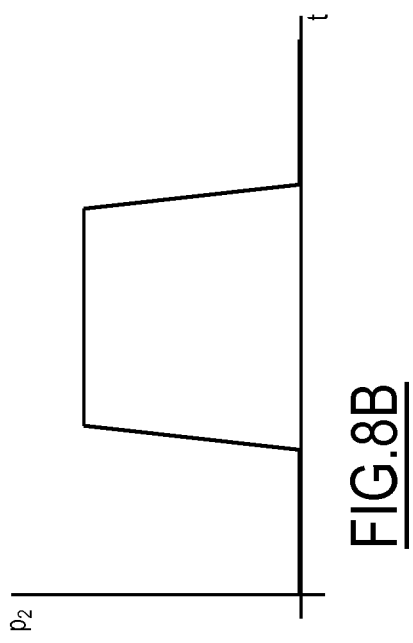
FIGS. 8A-8G are examples of a weekly set of probability functions representing the probability over time that an individual is at a work location.
Figure 8B:
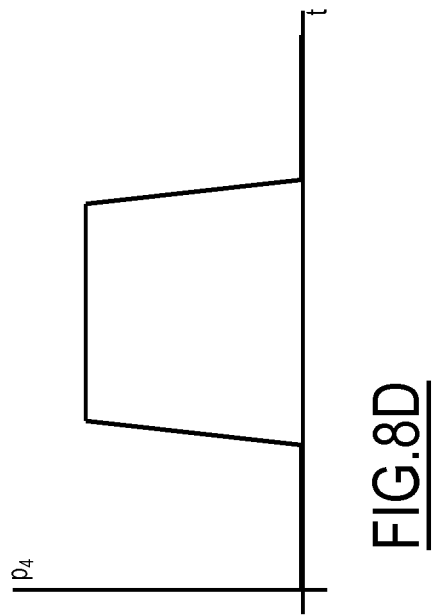
Figure 8C:
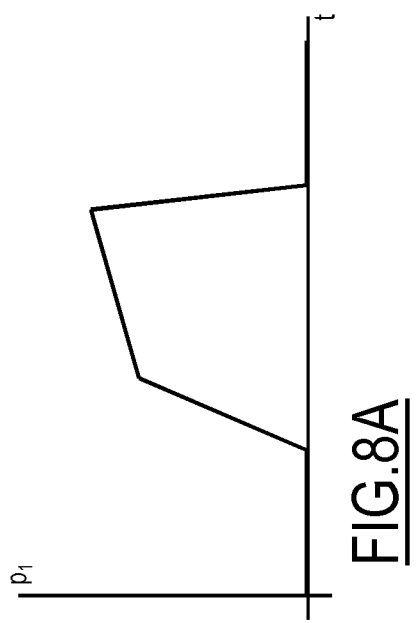
Figure 8D:
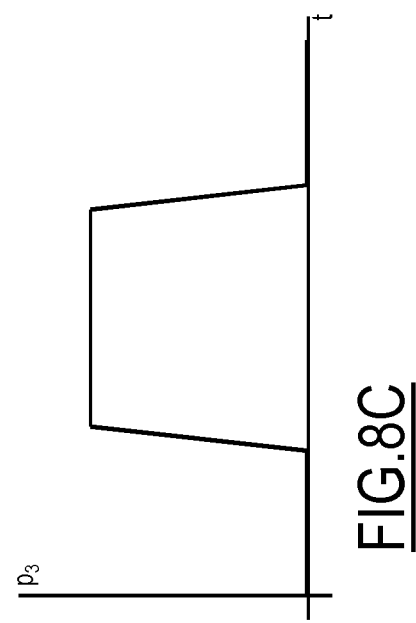
Figure 8F:
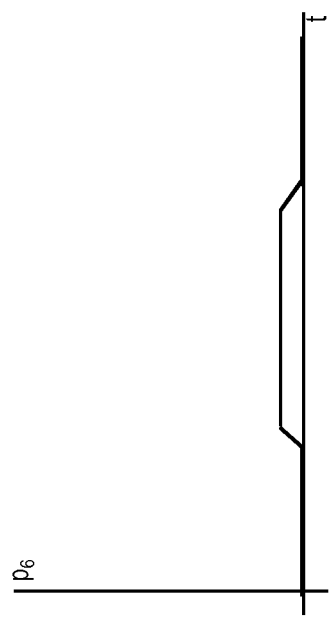
Figure 8G:
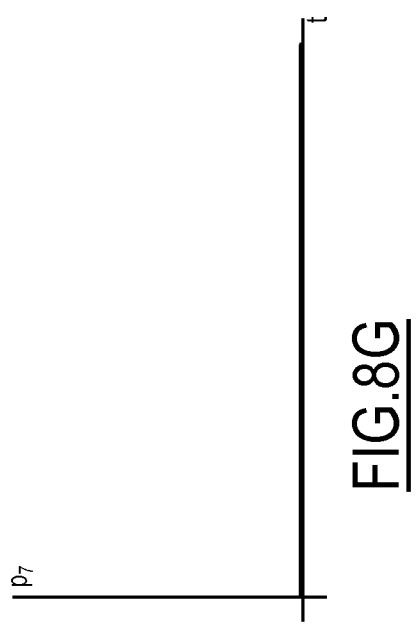
Figure 8E:
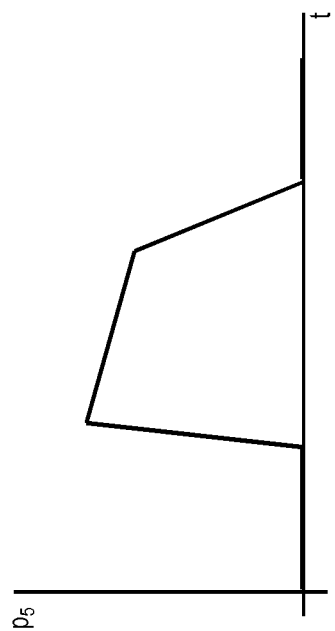

Having described the system 100, the RoI 200 and the structure of a set 400 of O-D matrices 300m comprising indications of movements among zones of the RoI 200, a method 700 for identifying and analyzing people (UE owners) movements, either with high or low frequency and able to determine the purposes which lead to such movements (i.e., the movement purpose p), according to an embodiment of the present invention will be now described, by making reference to FIGS. 7A-7C which are a schematic block diagram thereof.

In an embodiment of the invention, the identification of movements is based upon the identification of the locations between which each movement takes place. The system 100 is advantageously arranged for identifying places associated with (e.g., comprised within) each origin and/or destination zone in the RoI 200.

In an embodiment of the invention, the system 100 identifies also movement purposes p associated with the movements on the basis of the identified places.

Preferably, the movement purpose p may be determined on the basis of a type of location comprised in the destination zone $z_j$ of the movement. For example, a movement from any zone to the zone of the RoI 200 comprising the home place of the moving UE owner may be considered to have a family purpose, a movement from any zone to the zone of the RoI 200 comprising the work place of the moving UE owner may be considered to have a working purpose.

Initially, the user of the system 100 is asked to select through the user interface 125 an analysis time interval T (e.g., one or more days) within which the events $e_v$ to be considered for the processing occurred or, alternatively, to select all the events $e_v$ for which event records $er_v$ have been collected (step 703). For example, the analysis time interval T may be selected from a time range extending from the time at which the oldest event record $er_1$ has been collected up to the time at which the newest event record $er_M$ has been collected.

It should be noted that analysis time interval T is different from the observation period TP and they should be not mistaken one for the other.

The user of the system 100 is then asked to select through the user interface 125 one or more movement purposes p (step 706).

Preferably, at each purpose of movement is associated a value of the p purpose variable (e.g., p=1: family purpose, p=2: work purpose, p=3: entertainment purpose, etc.). The number of selected movement purposes determines the value of P.

For example, the system 100 may provide a list of identifiable movement purposes to the user and, through the user interface 125, the user can select one or more thereof.

It should be noted that the more movement purposes p are selected the more the O-D matrices 300*m* of the set are detailed.

In addition, one or more location types are associated by the system 100 with each one of the selected movement purposes p.

Location types according to an embodiment of the invention comprise home places, work places, entertainment places (e.g., theater), etc.

For example, family purpose is associated with home places, work purpose is associated with work places, entertainment purposes with pubs, discotheques, cultural purpose is associated with theaters, etc.

Alternatively or in addition, the administrator or the user of the system 100 may be allowed to define new movement purposes and/or location types and associations therebetween.

In an embodiment of the present invention, each identifiable type of location is associated with a corresponding set of probability functions $p_d(t)$ (d=D; where D is a positive integer). Each probability function $p_d(t)$ of the set describes the probability that an individual (together with her/his UE) is at the corresponding location at a time instant t during a time subinterval d.

Time subintervals d are portions of the analysis time interval T.

In a preferred embodiment of the invention, each time subinterval d may be a portion of the analysis time interval T with peculiar characteristics (with respect to the events $e_i$ as detailed in the following) that repeats periodically. For example, the analysis time interval T may correspond to a month and each time subinterval d may substantially correspond to a respective day of the week, i.e. from Monday (d=1) to Sunday (d=7), which are deemed to share common peculiar characteristics.

In other words, it is expected that UE owners follow substantially weekly-based routines which comprise similar, or substantially identical, movements performed on the corresponding day from week to week.

For example, a routine of a generic UE owner could comprise work hours and gym hours on substantially each Tuesday comprised in the analysis time interval T; therefore, the UE owners would perform corresponding routine movements on each Tuesday that comprise a first movement from a first zone comprising the home place of the UE owner to a second zone comprising the work place of the UE owner, a second movement from the second zone comprising the work place of the UE owner to a third zone comprising a gym and a third movement from the third zone comprising the gym to the first zone comprising the home place.

Advantageously, the sets of probability functions $p_d(t)$ are stored in the repository 115 of the system 100.

In a preferred embodiment of the invention, each set of probability functions $p_d(t)$ comprises seven probability functions (d=1, . . . , 7), each one describing the probability that the individual is at the corresponding location during a respective day of the week. Under this assumption, $p_1(t)$ is the probability function during Mondays, $p_2(t)$ is the probability function during Tuesdays, and so on up to $p_7(t)$ that is the probability function during Sundays. Therefore, each probability function $p_d(t)$ of the set of probability functions $p_d(t)$ has a weekly periodicity (i.e., the same probability function $p_d(t)$ is used after seven days) based on the assumption that habits of individuals follow a substantially weekly routine—even though different sets of probability function $p_d(t)$ with a different periodicity or non-periodic may be devised, e.g. for taking into account holidays and/or vacation periods.

In one embodiment according to the present invention, the circumstance that, at predetermined time instants t, there is no possibility for the individuals to be at a certain identifiable location (e.g., when the location is not accessible by individuals; such as for example in the case of a closing time of a gym or other entertainment locations), may be expressed by means of a negative value of the probability function $p_d(t)$ calculated at that time instants, such as for example a value ranging from −0.1 to −0.3.

Examples of such set of probability functions $p_d(t)$ are shown in FIGS. 8A-8G, which show a probability function set referred to a working location, and in FIGS. 9A-9G, which show a probability function set referred to an entertainment location (e.g., a pub).

Focusing on FIGS. 8A-8G, the set of probability functions $p_d(t)$ shows the probability that an individual with a clerktype work is at a respective work location. In detail, the probability functions $p_2(t)$, $p_3(t)$ and $p_4(t)$ for Tuesdays, Wednesdays and Thursdays, respectively, show a substantially constant and high probability (e.g., values equal to or greater than 0.7, for example values in the range from 0.7 to 0.9) that the individual is at the work location during central hours of the day (e.g., a 8-9 hours period). The probability functions $p_1(t)$ for Mondays and $p_5(t)$ for Fridays show rising and falling probability during time, respectively, that takes into account working hours reduction associated with such days. The probability function $p_6(t)$ for Saturdays shows a low probability (e.g., values equal to or lower than 0.3, for example values in the range from 0.0 to 0.3) that the individual is at the work location, while the probability function $p_7(t)$ for Sundays shows a substantially zero probability that the individual is at the work location.

Conversely, focusing on FIGS. 9A-9G, the set of probability functions $p_d(t)$ shows the probability that an individual spends time at an entertainment location, such as a pub. In detail, the probability functions $p_1(t)$, $p_2(t)$, $p_3(t)$ and $p_4(t)$ for Mondays, Tuesdays, Wednesdays and Thursdays, respectively, show a substantially constant and very low probability (e.g., values equal to or lower than 0.2, for example values in the range from 0.0 to 0.2, or, possibly, negative values as described above, e.g. values in the range from −0.1 to −0.3) that the individual is at the entertainment location during such days. Conversely, the probability functions $p_5(t)$, $p_6(t)$, and $p_7(t)$ for Fridays, Saturdays and Sundays show a high probability (e.g., values equal to or greater than 0.6, for example values in the range from 0.6 to 0.7) that the individual spends time at the entertainment location during evening and night hours.

The sets of probability functions $p_d(t)$ may be determined by the system administrator based upon his/her knowledge of the surveyed area 107 and/or statistical surveys performed on the population of the surveyed area 107 and, possibly, of neighboring areas. For example, the probability functions $p_d(t)$ of the sets of probability functions $p_d(t)$ may be determined based on information acquired by performing a "reconnaissance" statistical analysis on a behavior of a sample of people (e.g., where the size of the sample may be determined based on the size of the surveyed area), i.e. the places (i.e., locations) visited during days of a predetermined reconnaissance period (e.g., a predetermined number of days), and during which time instant(s) of the day such places are visited. Alternatively or in addition, the probability functions $p_d(t)$ of the sets of probability functions $p_d(t)$ may be determined based on attendance or "turnout" information—i.e., a precise or average number and its change over time of people present in a location (e.g., entertainment facilities such as for example cinemas, theaters, transport facilities such as for example underground stations, etc.) during such predetermined reconnaissance period—provided by management of the locations (e.g., managers of cinemas, theaters, museums, underground stations may provide information regarding a number of users/visitors as a function of time for example on the basis of sold tickets) to which the sets of probability functions $p_d(t)$ is referred. This way to define the sets of probability functions $p_d(t)$ results to be particularly advantageous (i.e., accurate) with respect to location corresponding to locations of which "reconnaissance" statistical analysis on a behavior of a sample of people are available (e.g., city squares, markets, pubs, etc.).

In addition, the user of the system 100 may be allowed to provide customs sets of probability functions $p_d(t)$ through the user interface 125.

Turning back to FIGS. 7A to 7C, in addition, the system 100 may allow the user selecting, defining or modifying existing sets of probability functions $p_d(t)$ and/or defining new location types associated with a selected movement purpose and/or selecting, defining or modifying movement purposes to be identified by the system 100. For example, the user may select or modify and/or insert sets of probability functions $p_d(t)$ along with selection of the one or more types of locations to be identified (step 706).

The system 100 therefore checks if one or more sets of probability functions $p_d(t)$ are to be modified and/or inserted (step 709).

In the affirmative case, the system 100 asks the user to input (through the user interface 125) corresponding new sets of probability functions $p_d(t)$ to be used for identifying and locating new locations (step 712).

It should be noted that in case the user choose to input new movement purposes he/she has also to associate each of such new movement purposes with at least one location type, in its turn already present in the system 100 or new location types to be inputted together with a respective set of probability functions $p_d(t)$.

Afterwards or in the negative case (i.e., no new movements types and/or location types and/or sets of probability functions $p_d(t)$ are to be modified and/or inserted), the computation engine 110 retrieves event records $er_v$ stored in the repository 115. Preferably, the computation engine 110 retrieves one group $erg_n$ of event records $er_v$ generated by a same UE at a time.

For example, the computation engine 110 initializes a UE variable n (e.g., n=0, . . . , N, N≥0; step 715) and then retrieve, e.g. sequentially, from the repository 115 a corresponding n-th event records group $erg_n$ therein stored (step 718).

The system 100 may check if the retrieved event records group $erg_n$ satisfies quality requirements before processing them (step 721). The quality requirements are designed for ensuring reliability and accuracy in results provided by the system 100 obtained through computation involving probability and statistic computation.

As a non-limitative example, data quality requirements to be fulfilled may comprise one or more of the following:
 a total number of events $e_v$ within the observation period T, associated with the event records group $erg_n$ is equal to, or greater than, a total events threshold;
 an average number of daily events $e_v$, within the analysis time interval T, associated with the event records group $erg_n$ is equal to, or greater than, a predetermined average events threshold, and/or
 a number of daily (or a different subinterval) events $e_v$ associated with the event records group $erg_n$ is equal to, or greater than, a daily (or a different subinterval) events threshold.

Preferably, the quality requirements are set by the system administrator through the administrator interface 120—even though alternative embodiments of the invention in which the quality requirements may be at least partly set by the user of the system 100 through the user interface 125 are not excluded.

In case, the event records group $erg_n$ do not satisfy quality requirements, the event records group $erg_n$ is discarded (step 724). Then it is checked if the event records group $erg_n$ is the last event records group to be considered (step 727). In the affirmative, the processing ends with the provision of computation results to the user through the user interface 125 (step 730, described in detail below). In the negative, a next event records group $erg_{n+1}$ (associated with another UE) is processed, the UE variable n is incremented by one (n=n+1; step 733) and the system 100 reiterates the step 718 in which the (next) n+1-th event records group $erg_{n+i}$ stored in the repository 115 is retrieved.

If the quality requirements check (back at step 721) has a positive outcome, for each event $e_v$ associated with an event record $er_v$ of the event records group $erg_n$ the system 100 computes a probability value that such event $e_v$ occurred at the selected location (step 736). For this purpose, the time data in each event record $er_v$ is used for selecting the probability function $p_d(t)$ of the set of probability functions $p_d(t)$ to be used (e.g., according to the day of the week indicated in the time data) and a time instant $t_v$ to be used (e.g., according to the moment of the day indicated in the time data) in the computation of the probability value.

Subsequently, the event records $er_v$ of the event records group $erg_n$ are used for clustering together similar events $e_v$ associated thereto (step 739) as described here below.

In the present disclosure, with the term "clustering" is intended the task of assigning a set of objects (the events $e_v$) to groups, called clusters $C_u$ (e.g., u=0, ..., U; U≥0), in such a way that the objects (the events $e_v$) in a same cluster are more "similar" to each other than those of other clusters.

The similarity among events $e_v$ is defined through a distance function calculating a distance (in space and time, as described below) between an object to be clustered and a central point, or centroid, $c_u$ of the cluster $C_u$ defined by other objects already clustered together in such cluster $C_u$. For example, in an embodiment of the present invention, the centroid $c_u$ of a cluster $C_u$ may be defined as a point having an average event probability $\bar{p}$ and an average cluster radius $\bar{r}$, where the average event probability $\bar{p}$ is defined as the mean value of the probability functions $p_d(t)$ of the events $e_v$ comprised in the cluster $C_u$ while the average location radius $\bar{r}$ is defined as the average of the radius $r_v$ of the cells 105b of the mobile telephony network 105 in which the events $e_v$ occurred (the radius $r_v$ is thus also the radius of the associated event $e_v$).

For example, the events $e_v$ are considered one by one, thus initially the generic cluster $C_u$ comprises only the first event considered $e_1$ which is also made correspond to the centroid $c_u$. Every time a subsequent event $e_v$ is comprised in the same cluster $C_u$, the centroid $c_u$ (i.e., the average event probability $\bar{p}$ and the average location radius $\bar{r}$) is recalculated taking into account such subsequently comprised event $e_v$.

Therefore, in the embodiment of the present invention the events $e_v$ associated with the same event records group $erg_n$ are analyzed and clustered together if they are sufficiently close in space and time to the centroid $c_u$ of the cluster $C_u$. The clustering of the event may be performed through any suitable clustering algorithm known in the art, such as for example the Hartigan Leader algorithm described in J. A. Hartigan "Clustering Algorithms", John Wiley e Sons Inc (April 1975).

In a preferred embodiment of the invention, such a "closeness" between the generic event $e_v$ and the centroid $c_u$ is defined by using a spatiotemporal distance function std, which may be expressed as follows:

$$std(c_u, e_v) = sd(c_u, e_v) + k \cdot td(c_u, e_v), \quad (2)$$

where $sd(c_u, e_v)$ is a spatial component of the spatiotemporal distance function std, $td(c_u, e_v)$ is a time component of the spatiotemporal distance function std, and k is a (confidence) parameter that may be set by the system administrator for adjusting the influence of the time component over the spatial component—e.g., if a statistical confidence associated with the probability function $p_d(t)$ is low. For example, probability functions $p_d(t)$ determined purely by means of a statistical analysis are deemed to have a low confidence; instead, probability functions $p_d(t)$ determined by means of detailed turnout information provided by management of the locations are deemed to have a high confidence. In one embodiment of the invention, a small value of k (for example in the order of few hundreds of meters, such as 500 m, or lower) may be used in order to attenuate the influence of the time component in case of low confidence associated with the probability function $p_d(t)$.

In one embodiment of the invention, the spatial component $sd(c_u, e_v)$ may be defined as:

$$sd(c_u, e_v) = \max[0, geo(c_u, e_v) - (\bar{r} + r_v)], \quad (3)$$

where $geo(c_u, e_v)$ is the distance between the centroid $c_u$ and the position (i.e., based on the position data comprised in the event record $er_v$) at which the event $e_v$ occurred. In its turn, the time component $td(c_u, e_v)$ may be defined as:

$$td(c_u, e_v) = \begin{cases} \bar{p} - p_d(t_i) & \text{if } \bar{p} * p_d(t_v) \geq 0 \\ 1 & \text{if } \bar{p} * p_d(t_v) < 0 \end{cases}. \quad (4)$$

The result of the spatiotemporal distance function std computed for the event $e_v$ is then compared with a spatiotemporal threshold distance, such as for example the parameter k introduced in equation (2). If such result is equal to, or lower than, the spatiotemporal threshold distance the corresponding event $e_v$ is considered sufficiently close (in space and time), or similar, to the centroid $c_u$, and the event $e_v$ is deemed to belong to the cluster $C_u$. In case the result of the spatiotemporal distance function std is greater than the spatiotemporal threshold distance, the corresponding event $e_v$ is considered not belonging to the cluster $C_u$ (and will be associated with a different cluster).

It should be noted that in the embodiment according to the present invention, in which it is implemented the Hartigan Leader algorithm, it is not defined any minimum or maximum number of allowable clusters $C_u$ that may be generated by the processing performed by the computation engine 110.

Nonetheless, in other embodiments of the present invention (not herein detailed) an algorithm different than Hartigan Leader algorithm may be implemented that defines a predetermined minimum and/or maximum number of allowable clusters $C_u$. For example, another algorithm that may be implemented is the so called "k-means" algorithm as described in MacQueen, J., "Some methods for classification and analysis of multivariate observations", 1967 Proc. Fifth Berkeley Sympos. Math. Statist. and Probability (Berkeley, Calif., 1965/66) Vol. I: Statistics, pp. 281-297 Univ. California Press, Berkeley, Calif.

Afterwards, the computation engine 110 proceeds with the computation of a (cluster) weight value $W_u$ for each cluster $C_u$ (step 742) determined at the previous step 739. Each weight value $W_u$ can be composed by a linear combination of a plurality of partial weight values, e.g. three partial weight values $w_1$, $w_2$ and $w_3$ in a preferred embodiment of the invention. Each partial weight value $w_1$, $w_2$ and $w_3$ is designed to take into account statistical aspects that affect the identification and the location of the selected location.

In a preferred embodiment of the invention, the weight value $W_u$ is computed as:

$$W_u = w_1 + \alpha w_2 + \beta w_3 \quad (5)$$

where α and β are adjustment coefficients defined by the system administrator, through the administrator interface 120. For example, the adjustment coefficients α and β can be determined in a preliminary test phase of the system 100 during which the system 100 identifies and analyzes people movements on the basis of event records provided from a group of test individuals, which explicitly declare which are their positions during a test observation period. In such a case, positions and movements of the test individuals during the test observation period are precisely known and may be compared with the results provided by the system 100; subsequently, the adjustment coefficients α and β may be determined in order to minimize any discrepancy between the known positions and movements and the results provided by the system 100 during the test phase.

For example, the (first) partial weight value $w_1$ takes into account the probability that each event $e_I$ (I=1, . . . , L; 0<L≤V) of the cluster $C_u$ has occurred, and may be expressed as:

$$w_1 = \sum_{l=1}^{L} p_d(t_l) \tag{6}$$

where $t_I$ (indicated in the time data of the corresponding event record en) is the time instant at which the event $e_I$ occurs in the observation subinterval d (indicated in the time data as well).

The (second) partial weight value $w_2$ takes into account the number of days (i.e., observation subinterval d) in which there are occurrence of events $e_I$ of the cluster $C_u$, i.e. the partial weight value $w_2$ corresponds to the number of days in which events $e_I$ of the cluster $C_u$ occurred, therefore, assuming that the analysis time interval T is expressed in days:

$$1 \le w_2 \le T, \tag{7}$$

where 1 means that the events $e_I$ occur only on a single day of the analysis time interval T and so on up to T, which means on each day at least one event $e_I$ of the cluster $C_u$ occurs. In other words, the partial weight value $w_2$ indicates in how many subintervals d of the analysis time interval T at least one event $e_I$ of the cluster $C_u$ has occurred. For example, let it be assumed that the analysis time interval T is equal to 7 days (e.g., from Monday to Sunday): the events occurred during such 7 days are analyzed. Assuming by way of example that the events $e_I$ occur only in one day, such as on Monday, of the analysis time interval T, then $w_2$=1. If instead the events $e_I$ occur in 3 different days of the analysis time interval T (e.g., Monday, Wednesday and Saturday), then $W_2$=3. If the events $e_I$ occur in every day of the analysis time interval T, then $w_2$=T (=7 in the considered example).

For example, by considering the analysis time interval T being equal to a week and the subinterval d being equal to a day, partial weight value $w_2$ equal to three indicates that events $e_I$ of the cluster $C_u$ occurred during three days (i.e., three different subintervals d) of the considered seven days (i.e., the time interval T); e.g., given that the generic cluster $C_u$ comprises eight events $e_I$ (L=8), two events $e_1$ and $e_2$ may have occurred on Monday, two events $e_3$ and $e_4$ may have occurred on Wednesday and four events $e_5$ to $e_8$ may have occurred on Friday.

The (third) partial weight value $w_3$ takes into account a weekly distribution of the occurrence of the events $e_I$. The partial weight value $w_3$ may be expressed as:

$$w_3 = T*H(X) \tag{8}$$

where H(X) is the Shannon entropy, as described for example in C. E. Shannon "A Mathematical Theory of communication", Bell System Technical Journal 27 (July/October 1948), of the cluster $C_u$ (i.e., the Shannon entropy of the cluster $C_u$ is computed by taking into account all the events $e_I$ of the cluster $C_u$) in the observation subinterval d (i.e., days of a week in the considered example), X is the day in which a generic event $e_I$ of the cluster $C_u$ occurs and T is the time interval expressed in days, or:

$$w_3 = T*H(X) = T*\left(-\sum_{d=1}^{7} p(d) \cdot \log_2(p(d))\right) \tag{9}$$

where p(d) is the probability density that X corresponds to a particular observation subinterval d, e.g. p(1) is the probability density that X corresponds to Mondays and so on up to p(7), which is the probability density that X corresponds to Sundays in case that the analysis time interval T comprises days corresponding to one or more weeks and the observation subintervals d correspond to respective days of such one or more weeks.

In parallel to steps 715-742, one or more threshold weight values $W_{th}$ are computed (step 745). For example, each threshold weight value $W_{th}$ is computed by assuming that a whole set of (ideal) events $e_{id}$ corresponding to a same individual (an ideal individual) are all generated in a predetermined location (e.g., home place, work place, gym, pub, etc.); i.e. for each event $e_{id}$ it is verified that there is a non-zero probability (e.g., a constant value or a value based on a threshold probability function associated with the predetermined location) that the ideal individual is at the predetermined location ($p_d(t_{id})$>0).

In other words, each set of the ideal events $e_{id}$ belongs to a same (ideal) cluster $C_{uid}$ associated with a corresponding predetermined location and the threshold weight value $W_{th}$ may be computed as described above through equation (5) by computing and combining corresponding partial weight values $w_1$, $w_2$ and $w_3$ as described above.

Preferably, the threshold weight value $W_{th}$ is used to provide an adjusted threshold value $W'_{th}$ (step 748):

$$W'_{th}=f \cdot W_{th} \tag{10}$$

where f is an adjustment parameter that can be set by the system administrator in order to attenuate (0<f≤1) the threshold weight value $W_{th}$.

The adjustment parameter f may be determined through the use of the event records regarding the group of test individuals, during the same test phase, and in a similar manner as, described above for determining the adjustment coefficients α and β.

In another embodiment according to the present invention, an alternative (adjusted) threshold weight value $W''_{th}$ is computed as:

$$W''_{th}=\mu+f \cdot \sigma, \tag{11}$$

where μ is the mean value of the weight values $W_u$ of all clusters $C_u$ identified and σ is the variance thereof.

In a different embodiment of the present invention, as (simplified) threshold weight value $W'''_{th}$ it can be selected the weight value $W_u$ with the highest value max($W_u$) among all the computed weight values $W_u$. In this way, the threshold weight value $W'''_{th}$ is determined in a very simple way under a computational point of view, but a lower accuracy in the results is obtained compared with the accuracy obtained by using the threshold weight values $W'_{th}$ and $W''_{th}$.

The weight value $W_u$ and the adjusted threshold value $W'_{th}$ are then used for determining if the corresponding cluster $C_u$ is referred to a location of the type previously selected by the user (step 751). The events $e_I$ of the cluster $C_u$ are considered occurred in a location of the type selected by the user if it is verified that the weight value $W_u$ is equal to, or greater than, the adjusted threshold value $W'_{th}$, or:

$$W_u \geq W'_{th}. \tag{12}$$

If the comparison at the step 751 has a negative outcome (i.e., $W_u < W'_{th}$), the events $e_I$ of the cluster $C_u$ are not considered to have occurred in a location of the type selected by the user, thus the cluster $C_u$ is discarded and the system 100 performs step 727 where it is checked whether the event records group $erg_n$ is the last event records group to be considered, as previously discussed. It should be noted that the weight $W_u$ (and/or any other intermediate result) might be stored in the repository 115, in order to be available for further processing (e.g., for verifying if the discarded cluster $C_u$ corresponds to a location of a different type without recalculating the weight $W_u$).

On the contrary, if it is verified that the weight value $W_u$ is equal to, or greater than, the adjusted threshold value $W'_{th}$ (i.e., $W_u \geq W'_{th}$), the events $e_I$ of the cluster $C_u$ are considered to have occurred in a location of the type selected by the user of the system 100.

Therefore, the system 100 provides an indication of a position of the location, denoted as cluster location position $\vec{pos}$ in the following, associated with the cluster $C_u$ (step 754).

Preferably, but not limitatively, the cluster location position $\vec{pos}$ may comprise a single geographical point, e.g. geographical coordinates of the centroid $c_u$ of the cluster $C_u$, and/or a geographical area, e.g. geographical coordinates of vertexes of the cells 105b of the mobile telephony network 105 in which the events $e_I$ of the cluster $C_u$ occurred.

For each cluster $C_u$ a normalized frequency distribution $F(dt_s)$ thereof is computed as a function of an event time interval $dt_s$ in which the event $e_I$ occurred.

In an embodiment of the present invention, one or more periodicity intervals $\delta t$ are considered for computing normalized frequency distribution $F(dt_s)$.

Preferably, although not limitatively, the periodicity interval $\delta t$ has a length corresponding to the subintervals d of the analysis time interval T, e.g. a (24-hours) day in the example at issue.

Nevertheless, it should be noted that periodicity intervals $\delta t$ are not necessarily comprised within the analysis time interval T.

Each periodicity interval $\delta t$ is subdivided in a predetermined number S of event time intervals $dt_s$ (i.e., s=1, ..., S; S positive integer).

In an embodiment of the present invention, the event time intervals $dt_s$ are selected all with an equal time length.

For example, S may be set equal to 96 (i.e., S=96), i.e. 96 event time intervals $dt_s$ are defined in the 24-hour-long subinterval d of the time period T, each one having a duration of fifteen minutes ($dt_1$=[00:00, 00:15), $dt_2$=[00:15, 00:30), ..., $dt_{96}$=[23:45, 24:00)).

It should be noted that the present invention is not dependent on the time length selected for the event time intervals $dt_s$ or on the number of periodicity intervals $\delta t$ considered. Preferably, a time length of the event time intervals $dt_s$ is selected shorter than a time length of the time slot $ts_m$ of the O-D matrices 300m.

A number of events $e_I$ occurring within each event time intervals $dt_s$ of each of the one or more periodicity intervals $\delta t$ considered is determined.

Preferably, the normalized frequency distribution $F(dt_s)$ is based on the number of occurrences of the event $e_I$ of the cluster $C_u$ during corresponding event time intervals $dt_s$ of the one or more periodicity intervals $\delta t$ considered.

For example, by considering seven periodicity intervals $\delta t$ (e.g., the days of a week) the normalized frequency distribution $F(dt_s)$ is computed on the basis of the occurrences of the events $e_I$ of the cluster $C_u$ during the corresponding event time intervals $dt_s$ of each seven periodicity intervals $\delta t$ (e.g., from the $dt_1$=[00:00, 00:15) of the first day to the $dt_1$=[00:00, 00:15) of the seventh day). In an embodiment of the invention, each generic event $e_I$ of the generic cluster $C_u$ contributes to the normalized frequency distribution $F(dt_s)$ with a value substantially equal to the probability function $p_d(t)$ associated therewith.

For example, the normalized frequency distribution $F(dt_s)$ may be computed as a sum of the number of occurrences of the events $e_I$ of the cluster $C_u$ during corresponding event time intervals $dt_s$ of the one or more considered periodicity intervals $\delta t$ weighted by the probability function $p_d(t)$ associated with such events $e_I$.

Therefore, since the normalized frequency distribution $F(dt_s)$ is a normalized distribution it follows that:

$$\sum_{s=1}^{S} F(dt_s) = 1. \tag{13}$$

Alternatively, nothing prevents from computing the normalized frequency distribution $F(dt_s)$ by summing the number of event in the corresponding event time interval $dt_s$ of the one or more considered periodicity intervals $\delta t$ divided (i.e., normalized) by the total number of event $e_I$ of the cluster $C_u$.

In summary, given a predetermined event time interval $dt_s$, the normalized frequency distribution $F(dt_s)$ represents the probability that, in the predetermined event time interval $dt_s$, at least one event $e_I$ has occurred in the location associated with the cluster $C_u$. In other words, the normalized frequency distribution $F(dt_s)$ indicates the probability that in the predetermined event time interval $dt_s$ of a generic periodicity interval $\delta t$ an observed UE owner is located in the cluster location position $\vec{pos}$.

Figure 10:
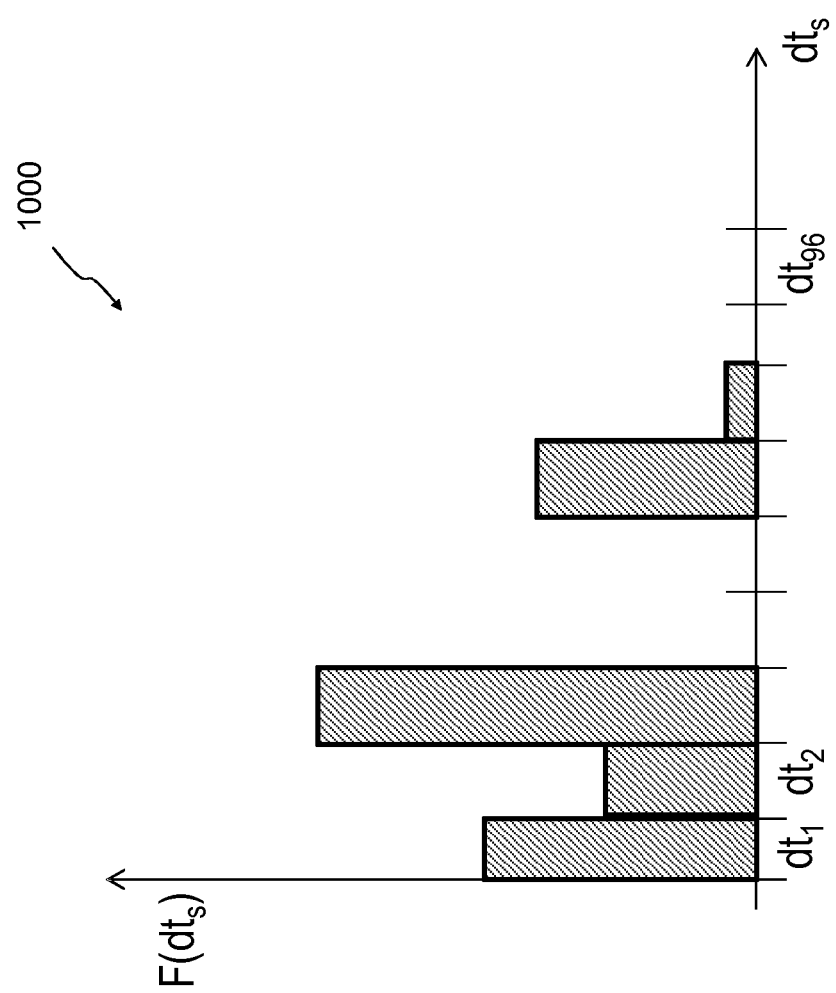
FIG. 10 is a schematic histogram of a normalized frequency distribution computed according to an embodiment of the present invention.

By way of example, FIG. 10 is a qualitative histogram 1000 of a normalized frequency distribution $F(dt_s)$ according to an embodiment of the invention. The histogram is plotted over an abscissa axis accounting for time and an ordinate axis accounting for a normalized frequency distribution $F(dt_s)$.

Preferably, the abscissa axis comprises S (e.g., S=96) event time intervals $dt_s$ referred to a considered time subintervals d of the time period T. Further, for each event time intervals $dt_s$, a corresponding bin extends along the ordinate axis up to a value (preferably comprised between 0 and 1) assumed by the normalized frequency distribution $F(dt_s)$ in the event time intervals $dt_s$.

Next (step 760), a location time interval $\hat{t}$ is obtained from the normalized frequency distribution $F(dt_s)$. The location time interval $\hat{t}$ is the time during which the n-th UE owner is considered to be in the location corresponding to the cluster location position $\vec{pos}$ determined at step 754 during the periodicity interval $\delta t$.

Preferably, the couple ($\vec{pos}$, $\hat{t}$) is exploited in the computation of the O-D matrices 300m as described in the following.

Preferably, a value of the location time interval $\hat{t}$ is substantially a mean value of the normalized frequency distribution $F(dt_s)$. In this manner the location time interval $\hat{t}$ is a mean average time during which the n-th UE owner may be in the location corresponding to the cluster location position $\widehat{pos}$ determined at step 754.

It should be noted that the values of the location time interval $\hat{t}$ may be computed in alternative manners without departing from the scope of the present invention. For example, the location time interval $\hat{t}$ may be alternatively coupled as a percentile of a value of the normalized frequency distribution $F(dt_s)$ computable by means of known statistical techniques applied to the normalized frequency distribution $F(dt_s)$ (e.g., the location time interval $\hat{t}$ may be selected as a value comprised between 90% and 40% of the mean value of the normalized frequency distribution $F(dt_s)$).

Generally, the computation method of the location time interval $\hat{t}$ may be defined by the administrator of the system 100 and/or by a user thereof.

Advantageously (step 763), further information may be associated with the couple ($\widehat{pos}$, $\hat{t}$). Preferably, on the basis of the location type of location at the cluster location position $\widehat{pos}$ a corresponding movement purpose p may be associated with the couple ($\widehat{pos}$, $\hat{t}$) (as described above).

In addition, For example, it may be defined that the UE owner may be found in the location identified by the cluster location position $\widehat{pos}$ for a fraction of days (i.e, periodicity intervals δt) substantially equal to $w_2/T$ (e.g., expressed as a percentage, where $w_2$ is the second partial weight value previously determined by means of relation (7))

In summary, the system 100 by performing the steps 736 to 763 may determine for each generic UE owner and for each location to which the UE owner moves a corresponding 4-tuple of parameters comprising: the movement purpose p, the cluster location position $\widehat{pos}$, the location time interval $\hat{t}$ and the fraction of days $w_2/T$, indicating UE owner 'habits' related to a particular location belonging to a selected location type (e.g., an indication of the frequency at which the UE owner visits such location).

Advantageously, the steps 736 to 763 are iterated for each one of the location types previously defined (at step 706).

After the steps 736 to 763, for the n-th generic UE owner it is available a set of U 4-tuples; i.e., one 4-tuple for each one of the clusters $C_u$ of the n-th UE owner.

Particularly, each 4-tuple of the set of U 4-tuples is associated with a respective location in which the events $e_I$ of a same cluster $C_u$ have occurred. In detail, the generic u-th 4-tuple of the set of U 4-tuples comprises a respective movement purpose $p_u$, a respective cluster location position $\widehat{pos}_u$, a respective location time interval $\hat{t}_u$ and a respective fraction of days $(w_2/T)_u$, associated with the location in which the events $e_I$ of the cluster $C_u$ have occurred The set of U 4-tuples of the n-th generic UE owner are preferably ordered in a list $L_{tuple,n}$ according to an increasing value of the respective location time intervals $\hat{t}_u$.

On the basis of the set of U 4-tuples the movements performed by the generic n-th UE owner are computed (step 766) and are then used to build the set 400 of O-D matrices 300m as described in the following.

Preferably, pairs of adjacent 4-tuples of the list $L_{tuple,n}$ of U 4-tuples (i.e., two 4-tuples having consecutive positions in the list $L_{tuple,n}$) are exploited for determining the entries of the O-D matrices 300m.

For example, by considering two adjacent 4-tuples of the list $L_{tuple,n}$—e.g., a 4-tuple associated with a first cluster $C_1$ and a 4-tuple associated with a second cluster $C_2$ assuming that the 4-tuples of the first cluster $C_1$ and of the second cluster $C_2$ comprise consecutive locations time intervals $\hat{t}_1$ and $\hat{t}_2$, respectively, a first cluster location position $\widehat{pos}_1$ of a first 4-tuple two adjacent 4-tuples denotes an origin of a movement of the n-th UE owner while indication second cluster location position $\widehat{pos}_2$ of a second 4-tuple two adjacent 4-tuples denotes a destination of the same movement of the n-th UE owner.

On the basis of the first cluster location position pose it is possible to identify a corresponding origin zone $z_i$ (i.e., the corresponding origin zone $z_i$ is identified as the zone $z_q$ of the RoI 200 comprising the first cluster location position $\widehat{pos}_1$) of the movement of the n-th UE owner and on the basis of the second cluster location position $\widehat{pos}_2$ it is possible to identify a corresponding destination zone $z_j$ of the movement of the n-th UE (i.e., the corresponding destination zone $z_j$ is identified as the zone $z_q$ of the RoI 200 comprising the second cluster location position $\widehat{pos}_2$). In other words an entry od(i,j) of corresponding to such a movement of the n-th UE owner is identified in the O-D matrices 300m.

The first and second location time intervals $\hat{t}_1$ and $\hat{t}_2$ allows identifying a time slot $ts_m$ in which the movement has taken place; i.e., it is also possible to identify a corresponding O-D matrix 300m of the set 400 associated with the time slot $ts_m$.

In one embodiment of the present invention, it is possible to determine a purpose associated with the movement just identified as the movement purpose $p_u$ of a 4-tuple associated with destination zone $z_j$ of the movement of the n-th UE identified by the analysis of two adjacent 4-tuples of the list $L_{tuple,n}$ as described above.

In the considered example, it is possible to determine a purpose associated with the movement just identified on the basis of a second movement purpose $p_2$ comprised in the second 4-tuple of the two adjacent 4-tuples (i.e., the movement purpose p associated with the location in the destination zone $z_j$ of the movement of the n-th UE owner); for example, the movement purpose $p_2$ is set as the purpose of the movement from the origin zone $z_i$ to the destination zone $z_j$ of the n-th UE.

In other words, it is possible to determine which sub-entry $od^p(i,j)$ or O-D sub-matrix 300$^p$m entry od(i,j) should be increased based on the movement purpose $p_2$ of the 4-tuple comprising the location position $\widehat{pos}_2$ identified as being comprised in the destination zone $z_j$ of the movement of the n-th owner described by the considered pair of adjacent 4-tuples of the list $L_{tuple,n}$; e.g., being the purpose of the movement from the origin zone $z_i$ to the destination zone $z_j$ of the n-th UE being set equal to the movement purpose $p_2$ the system 100 increases the sub-entry $od^p(i,j)$ accounting for the same movement purpose $p_2$ of the 4-tuple associated with the cluster $C_2$.

In summary, at step 766 the movements of the n-th UE owner are identified together with the purposes p which lead to such movements.

Generally, a movement is identified by analyzing two adjacent 4-tuples of the list $L_{tuple,n}$, for example, a first 4-tuple associated with a first cluster $C_u$ and a second 4-tuple associated with a second cluster $C_{u+1}$ 4-tuples of the first cluster $C_u$ and of the second cluster $C_{u+1}$ comprise consecutive locations time intervals $\hat{t}_u$ and $\hat{t}_{u+1}$, respectively, having subsequent location time intervals (i.e., 4-tuples of the first cluster $C_u$ and of the second cluster $C_{u+1}$ comprise consecutive locations time intervals $\hat{t}_u$ and $\hat{t}_{u+1}$, respectively, and different respective location positions (e.g., a first cluster location position $\widehat{pos}_u$ (origin) and a second cluster location position $\widehat{pos}_{u+1}$ (destination)). The first cluster location position ($\widehat{pos}_u$) is comprised within an origin zone $z_i$ (indicated on row i of the corresponding O-D matrix 300m) of the movement, since it is associated with the earliest location time interval ($\hat{t}_u$); while the second cluster location position ($\widehat{pos}_{u+1}$) is comprised within a destination location (indicated on column j of the corresponding O-D matrix 300m) of the movement of the n-th UE owner, since it is associated with the latest location time interval ($\hat{t}_{u+1}$).

Preferably, the purpose of such movement is identified by the movement purpose (e.g., a second movement purpose $p_{u+1}$) associated with the cluster location position $\widehat{pos}_{u+1}$ corresponding to the destination location of the movement of the n-th UE owner.

Therefore, one corresponding O-D matrix 300m (possibly also more than one matrices 300m) is selected for the identified movement on the basis of a time slot $ts_m$ comprising at least partly the location time intervals ($\hat{t}_1$, and $\hat{t}_{u+1}$) as described above.

The respective entry od(i,j) of the selected matrix 300m is chosen on the basis of the origin (row i of the matrix 300m) and destination (column j of the matrix 300m) locations respectively defined by the location positions (e.g., $\widehat{pos}_u$ and $\widehat{pos}_{u+1}$) of pairs of adjacent 4-tuples of the list $L_{tuple,n}$ as described above.

Moreover, the respective sub-entry $od^p(i,j)$ (or alternatively, the respective entry od(i,j) of the O-D sub-matrix $300^p$m) to be increased in order to account for the identified movement is selected on the basis of the movement purpose (e.g., $p_{u+1}$) associated with the location position (e.g., $\widehat{pos}_{u+1}$) corresponding to the destination location of the movement.

More preferably, the sub-entry $od^p(i,j)$ (or alternatively, the entry od(i,j) of the O-D sub-matrix $300^p$m) is increased by a value corresponding to the fraction of days (e.g., a second fraction of days $(w_2/T)_{u+1}$) of the 4-tuple of the pair of adjacent 4-tuples comprising the location position (e.g., $\widehat{pos}_{u+1}$) within the destination zone $z_j$ of the movement of the n-th UE owner.

The identification of movements of the n-th UE owner just described is then performed by analyzing the next pair of consecutive 4-tuples in the list $L_{tuple,n}$ until each pair of consecutive 4-tuples associated with the n-th UE owner is analyzed. In this manner, a complete contribution of the n-th UE owner to the set 400 of O-D matrices 300m is determined.

Afterwards, the system performs the step 727, where it is checked whether the event records group ergs is the last event records group to be considered as previously discussed (i.e., whether all the UE owners have been considered). In the negative case, as previously discussed, the system 100 performs to step 733 where the UE variable n is incremented by one (n=n+1) and then the system 100 iterated the step 718 in which the (next) n+1-th event records group $erg_{n+1}$ stored in the repository 115 is retrieved.

In the affirmative case, i.e. each event records group ergs in the repository has been analyzed (i.e., all the UE owners have been considered), the system 100 at step 730 provides computation results to the user through the user interface 125.

After such provision of the computation results the operation of the system 100 is concluded.

In other embodiments, the present invention may comprise methods featuring different steps or some steps may be performed in a different order or in parallel.

Thanks to the system 100 and method 700 is possible to manage, in an efficient way, large amounts of empirical data provided by the radio mobile network 105 for computing in a fast and reliable way sets of one or more O-D matrices accounting for movements within the Region of Interest 107 providing an indication of a purpose of each one of the movements (or flows) identified, even in the case of movements performed with a low frequency, between two zones $z_q$ in which the RoI 107 has been subdivided.

The invention claimed is:

1. A method for managing data regarding one or more flows of physical entities in a geographic area during at least one predetermined time period, wherein for each physical entity the data comprise a plurality of positioning data representing detected positions of the corresponding physical entity in said geographic area and corresponding time data identifying instants at which each position is detected, the method comprising:
   subdividing the geographic area into at least two zones;
   subdividing the at least one predetermined time period into one or more time slots;
   identifying a number of the physical entities that flowed from a first zone of the at least two zones to a second zone of the at least two zones during each time slot of the one or more time slots, and
   computing an Origin-Destination (O-D) matrix for each time slot of the one or more time slots based on said identifying, each Origin-Destination matrix comprising a respective row for each one of the at least two zones where the flow of the physical entities have started and a respective column for each one of the at least two zones where the flow of the physical entities have ended during the corresponding time slot, and each entry of the Origin-Destination matrix being indicative of the number of the physical entities that, during the corresponding time slot, flowed from the first zone to the second zone,
   wherein the step of identifying the number of the physical entities that flowed from the first zone to the second zone during each time slot comprises:
   for each physical entity, identifying a purpose of movement among predetermined purposes of movement which caused the physical entity flowing from the respective first zone to the respective second zone on the basis of an analysis of said data, said identifying the purpose of movement comprising:
   obtaining a first indication of a location in which each physical entity is located within the first zone, the first indication of the location comprising a first location type associated with said location:
   obtaining a second indication of a location in which each physical entity is located within the second zone, the second indication of the location comprising a second location type associated with said location, and
   associating a predetermined purpose of movement to the first and second indication of the respective location on the basis of the first location type and second location type, respectively, wherein, for each purpose of movement identified the step of computing the Origin-Destination matrix comprises:
calculating an indication of a number of physical entities that, during the corresponding time slot, flowed from the first zone to the second zone for a same purpose of movement.

2. The method according to claim 1, wherein the step of, for each physical entity, identifying the purpose of movement which caused the physical entity flowing from the respective first zone of the at least two zones to the respective second zone of the at least two zones comprises:
identifying the purpose of movement as the predetermined purpose of movement associated with the second zone of the at least two zones.

3. The method according to claim 1, wherein the steps of obtaining the first indication of the location in which each physical entity is located within the first zone of the at least two zones, and of obtaining the second indication of the location in which each physical entity is located within the second zone comprise:
for each physical entity either located within the first zone or in the second zone, clustering data in clusters according to a compliance with corresponding predetermined spatial and time parameters;
associating clusters with a respective location type on the basis of said predetermined spatial and time parameters, and
setting the respective location type as the first indication of the location or as the second indication of the location.

4. The method according to claim 3, wherein the step of associating clusters with the respective predetermined location type comprises:
for each cluster, evaluating a probability that the data comprised in the cluster are associated with at least one predetermined location type, and
associating the cluster with the respective predetermined location type on the basis of said probability.

5. The method according to claim 3, wherein the data are organized in events comprising a respective positioning datum and a respective time datum, and
wherein the step of computing the Origin-Destination matrix for each time slot of the one or more time slots further comprises:
for each event in a cluster, determining a set of parameters, comprising:
an indication of the purpose of movement, an indication of a location position associated with the cluster, a location time during which the physical entity associated with the event is in the location corresponding to the indication of the location position, and an indication of a frequency with which events of the cluster are associated with the location position, and
providing an indication of the number of the physical entities that, during the corresponding time slot, flowed from the first zone to the second zone for the same purpose of movement by comparing sets of parameters of events having consecutive time instants.

6. The method according to claim 5, wherein the step of, for each event in the cluster, determining a set of parameters comprises:
computing a normalized frequency distribution of an occurrence of events comprised in the cluster as a function of an event time interval comprised in a considered periodicity interval, and
determining the location time on the basis of said normalized frequency distribution.

7. The method according to claim 6, wherein computing the normalized frequency distribution in function comprises:
computing a sum of a number of occurrences of the event during corresponding event time intervals comprised in the considered periodicity interval weighted by a probability that the event occurred in the location type associated with the cluster.

8. The method according to claim 6, wherein determining the location time on the basis of said normalized frequency distribution comprises:
computing the location time as a mean value of the normalized frequency distribution.

9. The method according to claim 6 wherein the event time intervals are selected shorter than the time slots.

10. The method according to claim 6, wherein the step of providing the indication of the number of physical entities that, during the corresponding time slot, flowed from the first zone to the second zone for the same purpose of movement by comparing the sets of parameters of the events having the consecutive time instants comprises:
determining a flow of a physical entity from the first zone to the second zone when sets of parameters of events having consecutive time instants comprise different respective indications of a location position.

11. The method according to claim 1, wherein the step of computing the Origin-Destination matrix for each time slot of the one or more time slots comprises:
subdividing each entry of the Origin-Destination matrix in at least two subentries, each sub-entry providing an indication of the number of physical entities that, during the corresponding time slot, flowed from the first zone to the second zone, for the same purpose of movement.

12. The method according to claim 1 wherein the step of computing the Origin-Destination matrix for each time slot of the one or more time slots comprises:
subdividing the Origin-Destination matrix in at least two Origin-Destination sub-matrices, the entries of each Origin-Destination sub-matrices providing an indication of the number of the physical entities that, during the corresponding time slot, flowed from the first zone to the second zone for the same purpose of movement.

13. The method according to claim 11, wherein the step of providing the indication of the number of physical entities that, during the corresponding time slot, flowed from the first zone to the second zone for the same purpose of movement comprises:
increasing a selected sub-entry of the entry of the O-D matrix by a value computed on the basis of the indication of a frequency with which events of the cluster are associated with the location type, or
increasing a selected entry of the O-D sub-matrix of the O-D matrix by a value computed on the basis of the indication of a frequency with which the event is associated with the location type.

14. A system coupled with a wireless telecommunication network for managing data regarding one or more flows of physical entities in a geographic area during at least one predetermined time period, the system composing:
a computation engine adapted to process the data retrieved from a mobile telephony network;
a repository adapted to store the data, regarding interactions between corresponding User Equipment of the physical entities and the mobile telephony network, computation results generated by the computation engine, and/or processing data generated by and/or provided to the system, and an administrator interface operable for modifying parameters and/or algorithms used by the computation engine and/or accessing data stored in the repository, characterized by further comprising a memory element storing a software program product configured for implementing the method of claim 1 through the system.

15. The system according to claim 14, further comprising at least one user interface adapted to receive inputs from, and to provide output to a user of the system, the user comprising one or more human beings and/or one or more external computing systems subscriber of services provided by the system.

* * * * *